United States Patent
Horiuchi et al.

(10) Patent No.: US 9,014,617 B2
(45) Date of Patent: Apr. 21, 2015

(54) WIRELESS RELAY DEVICE AND WIRELESS RELAY METHOD

(75) Inventors: Ayako Horiuchi, Kanagawa (JP); Yasuaki Yuda, Kanagawa (JP); Seigo Nakao, Kanagawa (JP); Alexander Golitschek Edler Von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 397 days.

(21) Appl. No.: 13/575,444

(22) PCT Filed: Feb. 10, 2011

(86) PCT No.: PCT/JP2011/000746
§ 371 (c)(1), (2), (4) Date: Jul. 26, 2012

(87) PCT Pub. No.: WO2011/099289
PCT Pub. Date: Aug. 18, 2011

(65) Prior Publication Data
US 2012/0302158 A1 Nov. 29, 2012

(30) Foreign Application Priority Data
Feb. 12, 2010 (JP) .................................. 2010-029408

(51) Int. Cl.
*H04B 3/36* (2006.01)
*H04B 7/155* (2006.01)
*H04W 16/26* (2009.01)
*H04W 84/04* (2009.01)

(52) U.S. Cl.
CPC ........... *H04B 7/15542* (2013.01); *H04W 16/26* (2013.01); *H04W 84/047* (2013.01)

(58) Field of Classification Search
CPC ........................................ H04B 7/15–7/15592
USPC ........................... 455/7–11.1, 14–25; 370/315
See application file for complete search history.

(56) References Cited

PUBLICATIONS

3GPP RAN1 59bis "R1-100807 WF on timing of backhaul and access link in uplink" Valencia, Spain, Jan. 18-22, 2010.
3GPP TSG RAN WG1 Meeting #59 R1-094489 "UL/DL timing and guard periods in backhaul subframes" Jeju, Korea, Nov. 9-13, 2009.
3GPP TSG RAN WG1 Meeting #59 bis R1-100383 "RN UL/DL subframe timing of backhaul and access link" Valencia, Spain, Jan. 18-22, 2010.
International Search Report for Application No. PCT/JP2011/000746 dated Mar. 8, 2011.

*Primary Examiner* — Raymond Dean
(74) *Attorney, Agent, or Firm* — Pearne & Gordon LLP

(57) ABSTRACT

In a wireless relay method for relaying a signal between a base station and a mobile station, if an SRS is transmitted in a subframe immediately previous to the backhaul subframe, the last symbol of an access link subframe is set as a fake symbol in which the SRS that the mobile station transmits to the wireless relay device is not configured. The signal transmitted from the mobile station to the wireless relay device in a previous symbol of one of the fake symbol is received, and switched to transmission from the wireless relay device to the base station. If the SRS is not transmitted in a subframe immediately previous to the backhaul subframe, the signal transmitted from the mobile station to the wireless relay device is received in the last symbol of the access link subframe, and switched to transmission from the wireless relay device to the base station.

8 Claims, 16 Drawing Sheets

WIRELESS RELAY DEVICE AND WIRELESS RELAY METHOD

TECHNICAL FIELD

The present invention relates to a wireless relay device and a wireless relay method.

BACKGROUND ART

Recently, with the development of multimedia information, cellular mobile communication systems have been generalized to transmit not only voice data but also mass data such as still image data, moving image data, and the like. In order to realize the transmission of mass data, there has been active study regarding technology using a high frequency radio band to achieve a high transmission rate.

However, in the case of using a high frequency radio band, a high transmission rate can be expected in a short distance, whereas attenuation due to the transmission distance becomes larger as the distance becomes longer. Accordingly, in the case of actually operating a mobile communication system using a high frequency radio band, the coverage area of a wireless communication base station device (hereinafter abbreviated to as a "base station") becomes smaller, and due to this, there is a need to install many more base stations. Since installing such base stations incurs costs, there has been strong demand for a technology for realizing a communication service using a high frequency radio band while suppressing the increase of the number of base stations.

In order to expand coverage areas of respective base stations with respect to such requests, as shown in a wireless relay system of FIG. 11, a relay transmission technology has been studied, in which a wireless communication relay station device (hereinafter abbreviated to as a "relay station") 30 is installed between a base station 10 and a wireless communication mobile station device (hereinafter abbreviated to as a "mobile station") 20, and communications between the base station 10 and the mobile station 20 are performed through the relay station 30. Using the relay technology, a terminal that is unable to communicate directly with the base station 10 can communicate with the base station 10 through the relay station 30. Further, a mobile station is a mobile station that is connected to the base station 10.

[Explanation of TD Relay]

Next, a TD relay will be described with reference to FIGS. 12 and 13. FIG. 12 is a conceptual diagram explaining a TD relay in an uplink, and FIG. 13 is a conceptual diagram explaining a TD relay in a downlink.

In the uplink as shown in FIG. 12, in a subframe #2, the mobile station 20 makes a transmission to the relay station 30 on an access link, and in a subframe #3, the relay station 30 performs communications with the base station 10 on a backhaul link. In a subframe #4, the mobile station 20 makes a transmission again to the relay station 30. Similarly, in the downlink as shown in FIG. 13, in the subframe #2, the relay station 30 makes a transmission to the mobile station 20 on the access link, and in the subframe #3, the base station 10 performs communications with the relay station 30 on the backhaul link. In the subframe #4, the relay station 30 makes a transmission again to the mobile station 20.

As described above, in the TD relay, the transmission from the base station 10 to the relay station 30 and the transmission from the relay station 30 to the mobile station 20 are divided by time. Like this, the communications on the backhaul link and the communications on the access link may be divided by time. The relay station 30 may divide the transmission time and the reception time. Accordingly, the relay station 30 may relay signals without being affected by wraparound between a transmission antenna and a reception antenna.

[Explanation of Guard Time]

In the relay station 30, for switchover from transmission to reception or switchover from reception to transmission, it is necessary to provide a guard period for switching an RF (Radio Frequency) circuit. FIG. 14 is a diagram explaining a guard period. As shown in FIG. 14, for switchover from transmission to reception or switchover from reception to transmission in a subframe, each guard period is provided. The guard period exerts an influence on the performance of the device, and is assumed to be about 20 [µs].

[Switching Timing]

Since the guard period is necessary in the TD relay, a subframe that is unable to be transmitted or received occurs. In the 3GPP RAN1#59b meeting, in order to prepare a guard period, how to sacrifice the first OFDM symbol of a backhaul subframe (hereinafter referred to as "Case A"), how to sacrifice the last OFDM symbol of a backhaul subframe (hereinafter referred to as "Case B"), and how to sacrifice the last OFDM symbol of an access link (hereinafter referred to as "Case C") have been studied (see NPL 1).

Next, referring to FIGS. 15 to 17, the above-described Case A, Case B, and Case C will be described. FIG. 15 is a diagram explaining an example [1] of preparing a guard period (corresponding to Case A), FIG. 16 is a diagram explaining an example [2] of preparing a guard period (corresponding to Case B), and FIG. 17 is a diagram explaining an example [3] of preparing a guard period (corresponding to Case C). In the drawings, the horizontal axis represents time [µs].

In FIGS. 15 to 17, subframe A (backhaul subframe) indicates communications from a relay station 30 to a base station 10, and subframes B and C (access link subframes) indicate communications from a mobile station 20 to the relay station 30. Each of the subframes A, B, and C includes SC-FDMA (Single Carrier-Frequency Division Multiple Access) symbols #0 to #13. The symbol length of the SC-FDMA symbol is about 71.4 [ms].

Further, in FIGS. 15 to 17, a period between arrows indicated by Δshift B or Δshift F represents a guard period. In the drawings, a switching period indicates time taken for the relay station 30 to perform switching from transmission to reception or switching from reception to transmission.

Further, in FIGS. 15 to 17, rUE transmission indicates a transmission timing of the mobile station 20 to the relay station 30, RN reception indicates a reception timing of the relay station 30 from the mobile station 20, RN transmission indicates the transmission timing of the relay station 30 to the base station 10, and eNB reception indicates the reception timing of the base station 10 from the relay station 30.

Further, in FIGS. 15 to 17, tilting blocks denoted by SC-FDMA symbols #0 to #13 (in the drawings, # is omitted and only numerals are denoted) indicate the propagation delay of symbols. For example, in FIG. 15, the symbols transmitted from the mobile station 20 to the relay station 30 at time T1 are received in the relay station 30 at time T2. Similarly, in FIGS. 16 and 17, the slope of the blocks indicates the propagating delay of the symbols.

The relay station 30 can control the reception timing from the mobile station 20 to the local station (or transmission timing from the mobile station 20 connected to the local station to the local station). Further, the reception timing from the relay station 30 to the base station 10 (or transmission timing from the relay station to the base station 10) has been set in the base station 10.

In the example [1] of preparing the guard period as shown in FIG. 15 (Case A), the relay station 30 transmits SC-FDMA symbols #1 to #13 (in the case of a normal CP length) to the base station 10. The relay station 30 can transmit the SC-FDMA symbol #13. The SC-FDMA symbol #13 is an SRS (Sounding Reference Signal) transmission symbol (defined in the Rel. 8 LTE specification). That is, the relay station 30 can transmit the SRS.

[Explanation of SRS]

The SRS is a signal for measuring the channel quality of a broad band connection. As the mobile station transmits the SRS to the base station, the base station measures the channel quality of an RB through which the SRS has been transmitted and refers to the measured channel quality in order to allocate resources to the mobile station. The SRS is placed in the SC-FDMA symbol #13. In the case of transmitting the SRS, the mobile station transmits the SC-FDMA symbols #0 to #12 on a PUCCH (Physical Uplink Control Channel) and a PUSCH (Physical Uplink Shared Channel), and transmits the SRS on the SC-FDMA symbol #13.

In the example [2] of preparing the guard period as shown in FIG. 16 (Case B), the relay station 30 transmits the SC-FDMA symbols #0 to #12 (in the case of the normal CP length) to the base station 10. In the example shown in FIG. 16, it is possible to apply PUCCH and PDSCH formats of Rel. 8 LTE to the backhaul channel as they are. Further, in the case of using the SC-FDMA 13 for the SRS, an R-PUCCH (PUCCH for a relay) and an R-PUSCH (PUSCH for a relay) use the SC-FDMA 0 to 12.

In the example [3] of preparing the guard period as shown in FIG. 17 (Case C), the relay station 30 transmits the SC-FDMA symbols #0 to #13 (in the case of the normal CP length) to the base station 10. The relay station 30 can transmit all the SC-FDMA symbols, but symbols that the relay station 30 can receive from the mobile station 20 connected to the local station become the SC-FDMA symbols #0 to #12 (in the case of the normal CP).

CITATION LIST

Non Patent Literature

[NPL 1] 3GPP RAN1 59bis "R1-100807 WF on timing of backhaul and access link in uplink"

SUMMARY OF INVENTION

Technical Problem

Here, in order to realize the example [1] of preparing the guard period as shown in FIG. 15, the relay station 30 may shift the UL reception timing of the access link backward from the UL transmission timing of the backhaul for Δshift B. However, in the example [1] of preparing the guard period as shown in FIG. 15 (Case A), new PUCCH and PUSCH formats, which do not transmit the SC-FDMA symbol #0, are necessary. Particularly, in the PUCCH that includes ACK/NACK, CQI, and the like, if the SC-FDMA symbol #0 is simply punctured and transmitted, the orthogonality of codes that are used to multiplex the PUCCH is broken. Because of this, there is a problem that a new format in which the orthogonality is not broken is necessary.

Further, in order to realize the example [2] of preparing the guard period as shown in FIG. 16, the relay station 30 shifts the UL reception timing of the access link forward from the UL transmission timing of the backhaul by Δshift F. However, in the example [2] of preparing the guard period as shown in FIG. 16 (Case B), the relay station is unable to transmit the SRS on the SC-FDMA symbol #13, and thus it is difficult to measure the channel quality between the relay station and the base station in a broad band.

Further, in order to realize the example [3] of preparing the guard period as shown in FIG. 17, the relay station 30 shifts the UL reception timing of the access link backward from the UL transmission timing of the backhaul by Δshift B. However, in the example [3] of preparing the guard period as shown in FIG. 17 (Case C), in a subframe immediately previous to the backhaul subframe, a cell specific SRS is configured constantly in the access link, and the SRS is not allocated to the mobile station connected to the relay station. Because of this, the mobile station connected to the relay station is unable to transmit the PUSCH, PUCCH, and SRS using the SC-FDMA 13.

Further, in the example [3] of preparing the guard period as shown in FIG. 17 (Case C), in the subframe that transmits the SRS, the configuration of the cell specific SRS has been determined for each cell, and the relay station can specify the transmission interval and the transmission subframe as a specific SRS configuration of the mobile station among the determined configurations.

However, in LTE, patterns that can be specified have been predetermined. Because of this, in the subframe immediately previous to the backhaul subframe, it may be considered that the mobile station connected to the relay station transmits the SRS. In this case, although the mobile station transmits the SRS, the relay station disregards the SRS of the mobile station, and switches over to transmission.

Accordingly, an object of the present invention is to provide a wireless relay device or a wireless relay method, which can improve the utilization efficiency of resources.

Solution to Problem

A wireless relay device of the present invention that relays a signal between a base station and a mobile station, includes:
a transmission section configured to transmit a signal and an SRS to the base station using a backhaul subframe that is subframe for performing communication between the base station and the wireless relay device;
a reception section configured to receive a signal and an SRS transmitted to the wireless relay device using an access link subframe that is subframe for performing communication between the mobile station and the wireless relay device at a reception start timing of the access link subframe shifted before a transmission end timing of the backhaul subframe;
a switching section configured to switch a transmission mode for performing transmission from the wireless relay device to the base station and a reception mode for performing reception from the mobile station; and
an SRS setting section configured to set a configuration of the SRS that the mobile station transmits to the wireless relay device,
wherein if the transmission section transmits the SRS in a subframe immediately previous to the backhaul subframe, the SRS setting section sets a last symbol of the access link subframe as a fake symbol in which the SRS that the mobile station transmits to the wireless relay device is not configured,
the reception section receives the signal transmitted from the mobile station to the wireless relay device in a symbol immediately previous to the fake symbol, and then the switching section switches from the reception mode to the transmission mode, and if the transmission section does not transmit the SRS in the subframe immediately previous to the backhaul subframes, the reception section receives the signal transmitted from the mobile station to the wireless relay device in the last symbol of the access link subframe, and then the switching section switches from the reception mode to the transmission mode.

A wireless relay device of the present invention that relays a signal between a base station and a mobile station, includes: a transmission section configured to transmit a signal and an SRS to the base station using a backhaul subframe that is subframe for performing communication between the base station and the wireless relay device;
a reception section configured to receive a signal and an SRS transmitted to the wireless relay device using an access link subframe that is subframe for performing communication between the mobile station and the wireless relay device at a reception start timing of the access link subframe shifted after a transmission end timing of the backhaul subframe;
a switching section configured to switch a transmission mode for performing transmission from the wireless relay device to the base station and a reception mode for performing reception from the mobile station; and
an SRS setting section configured to set a configuration of the SRS that the mobile station transmits to the wireless relay device,
wherein if the transmission section transmits the signal in a first symbol of the backhaul subframe, the SRS setting section sets a last symbol of the access link subframe as a fake symbol in which the SRS that the mobile station transmits to the wireless relay device is not configured,
the reception section receives the signal transmitted from the mobile station to the wireless relay device in a symbol immediately previous to the fake symbol, and then the switching section switches from the reception mode to the transmission mode, and
if the transmission section does not transmit the signal in the first symbol of the access link subframe, the reception section receives the signal transmitted from the mobile station to the wireless relay device in the last symbol of the access link subframe, and then the switching section switches from the reception mode to the transmission mode.

A wireless relay device of the present invention that relays a signal between a base station and a mobile station, includes: a transmission section configured to transmit a signal and an SRS to the base station using a backhaul subframe that is subframe for performing communication between the base station and the wireless relay device;
a reception section configured to receive a signal and an SRS transmitted to the wireless relay device using an access link subframe that is subframe for performing communication between the mobile station and the wireless relay device at a reception start timing of the access link subframe shifted after a transmission end timing of the backhaul subframe;
a switching section configured to switch a transmission mode for performing transmission from the wireless relay device to the base station and a reception mode for performing reception from the mobile station; and
an SRS setting section configured to set a configuration of the SRS that mobile station transmits to the wireless relay device,
wherein if the transmission section transmits the signal in a last symbol of the backhaul subframe, the transmission section transmits the signal in the last symbol of the backhaul subframe, and then the switching section switches from the transmission mode to the reception mode,
if the transmission section does not transmit the signal in the last symbol of the backhaul subframe, the SRS setting section sets the last symbol of the backhaul subframe as a fake symbol in which the SRS that the wireless relay device transmits to the base station is not configured,
the transmission section transmits the signal in a symbol immediately previous to the last symbol of the backhaul subframe, and then the switching section switches from the transmission mode to the reception mode, and
the reception section receives the signal transmitted from the mobile station to the wireless relay device in a last symbol of the access link subframe having the same subframe number as the backhaul subframe, after the switching section switches from the transmission mode to the reception mode.

In the above mentioned wireless relay device of this invention, the SRS setting section determines the configuration of a cell specific SRS for each cell as a subframe having a possibility for receiving the SRS by the base station or the wireless relay device, and
sets the fake symbol by determining the configuration of a mobile station specific SRS among subframes included in the determined configuration of the cell specific SRS.

A wireless relay method of this invention for relaying a signal between a base station and a mobile station, includes: receiving a signal and an SRS transmitted to a relay station at a reception start timing of an access link subframe shifted before a transmission end timing of a backhaul subframe;
if the SRS is transmitted in a subframe immediately previous to the backhaul subframe, setting a last symbol of the access link subframe as a fake symbol in which the SRS that the mobile station transmits to the relay station is not configured;
receiving the signal transmitted from the mobile station to the relay station in a symbol immediately previous to the fake symbol, and then switching to transmission from the relay station to the base station; and
if the SRS is not transmitted in the subframe immediately previous to the backhaul subframes, receiving the signal transmitted from the mobile station to the relay station in the last symbol of the access link subframe, and then switching to transmission from the relay station to the base station.

A wireless relay method of this invention for relaying a signal between a base station and a mobile station, includes: receiving a signal and an SRS transmitted to a relay device at a reception start timing of an access link subframe shifted after a transmission end timing of a backhaul subframe;
if the signal is transmitted in a first symbol of the backhaul subframe, setting a last symbol of the access link subframe as a fake symbol in which the SRS that the mobile station transmits to the relay station is not configured, receiving the signal transmitted from the mobile station to the relay station in a symbol immediately previous to the fake symbol, and then switching to transmission from the relay station to the base station; and
if the signal is not transmitted in the first symbol of the backhaul subframe, receiving the signal transmitted from the mobile station to the relay station in the last symbol of the access link subframe, and then switching to transmission from the relay station to the base station.

A wireless relay method of this invention for relaying a signal between a base station and a mobile station, includes: receiving a signal and an SRS transmitted to a relay device at a reception start timing of an access link subframe shifted after a transmission end timing of a backhaul subframe;
if the signal is transmitted in a last symbol of the backhaul subframe, transmitting the signal in the last symbol of the backhaul subframe, and then switching to reception from the mobile station to a relay station; and if the signal is not transmitted in the last symbol of the backhaul subframe, setting the last symbol of the backhaul subframe as a fake symbol in which the SRS that the relay station transmits to the base station is not configured, switching to reception from the mobile station to the relay station after transmitting the signal in a symbol immediately previous to the last symbol of the backhaul subframe, and receiving the signal transmitted from the mobile station to the relay station in a last symbol of the access link subframe having the same subframe number as the backhaul subframe.

Advantageous Effects of Invention

According to the wireless relay device or the wireless relay method according to the present invention, the utilization efficiency of the resources can be improved.

DESCRIPTION OF EMBODIMENTS

Hereinafter, embodiments of the present invention will be described with reference to the drawings.

First Embodiment

Figure 1:
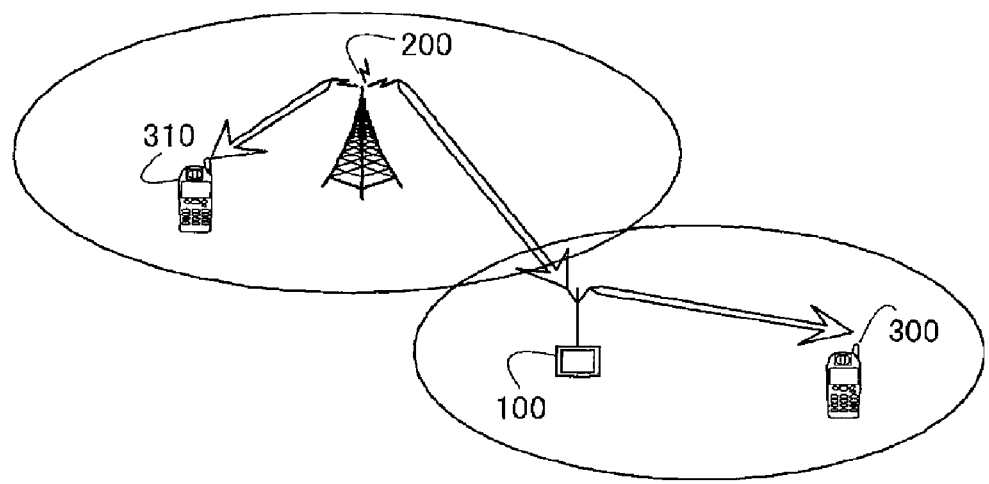
FIG. 1 is a diagram illustrating a wireless relay system according to a first embodiment.
Figure 11:
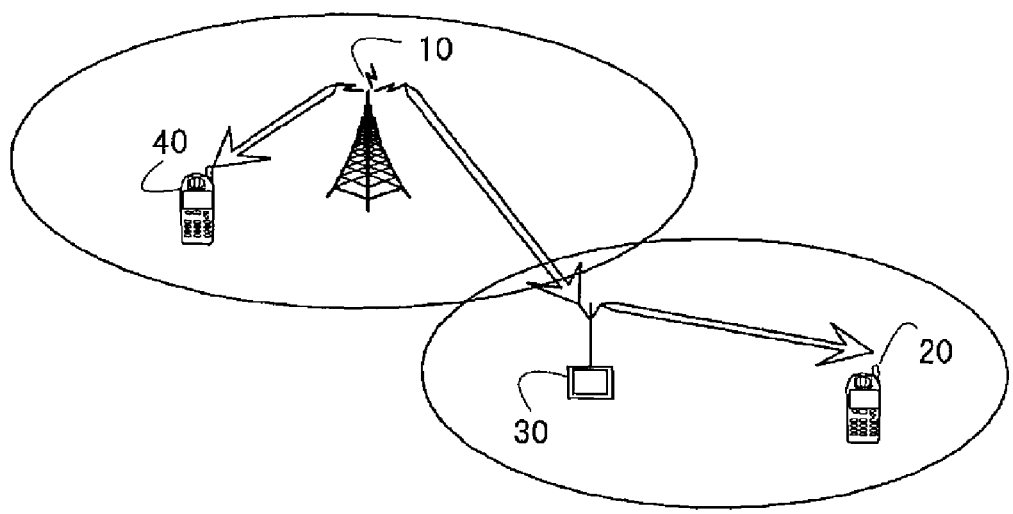
FIG. 11 is a diagram illustrating a wireless relay system.
Figure 12:
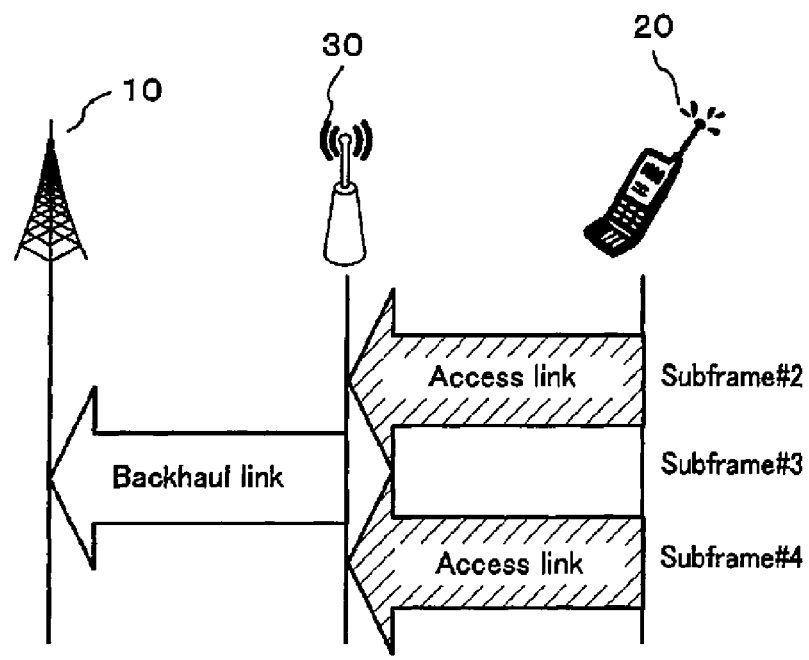
FIG. 12 is a conceptual diagram explaining a TD relay in an uplink.
Figure 13:
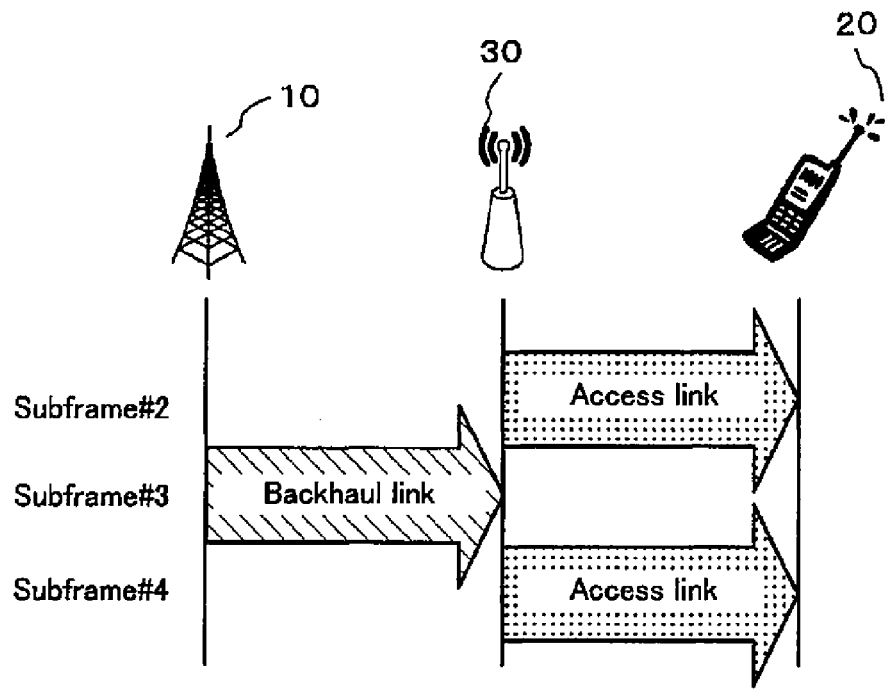
FIG. 13 is a conceptual diagram explaining a TD relay in a downlink.
Figure 14:
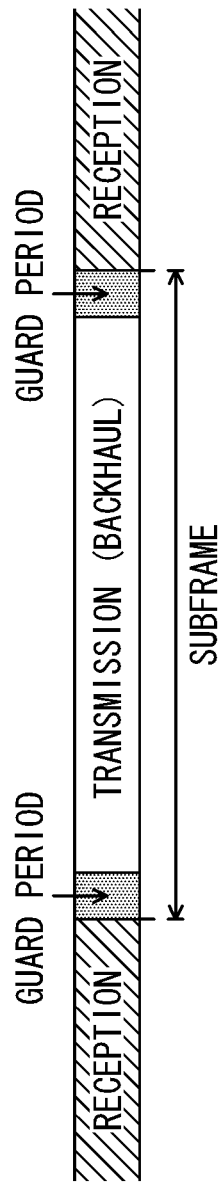
FIG. 14 is a diagram explaining a guard period.
Figure 15:
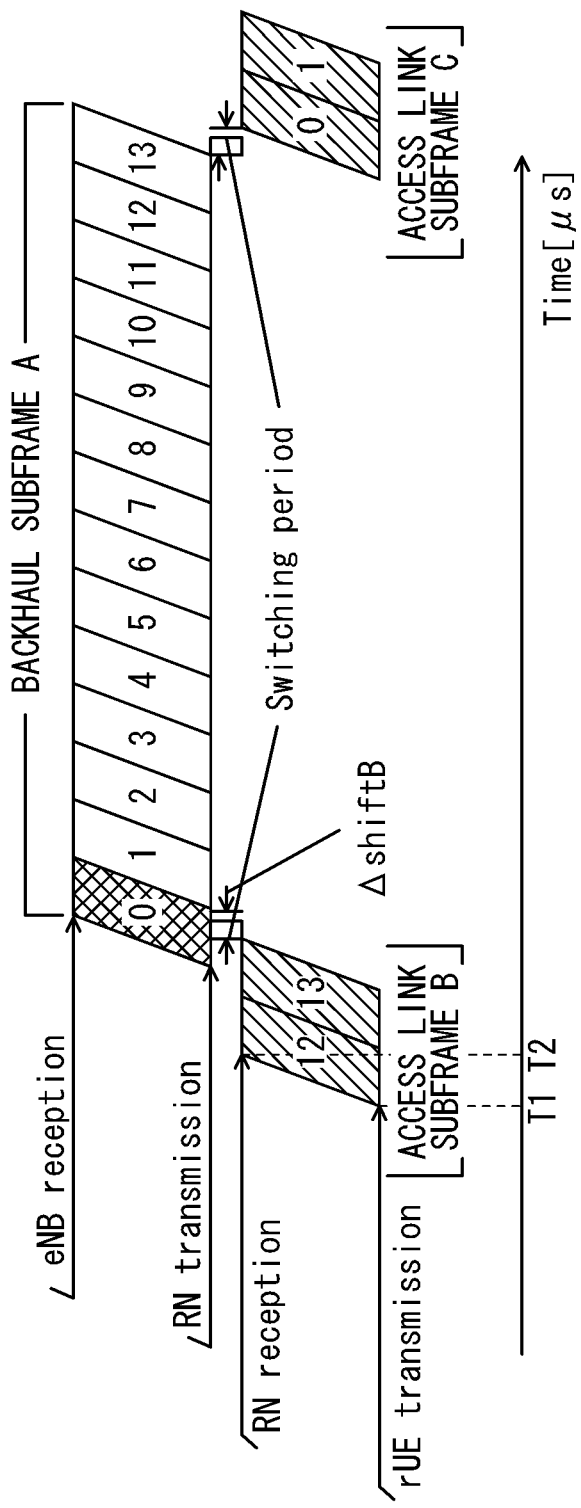
FIG. 15 is a diagram explaining an example [1] of preparing a guard period.

FIG. 1 is a diagram illustrating a wireless relay system according to a first embodiment. In a wireless relay system according to the first embodiment shown in FIG. 1, in the same manner as that in FIG. 11, a wireless communication relay station device (hereinafter referred to as a "relay station 100") 100 is installed between a base station 200 and a wireless communication mobile station device (hereinafter referred to as a "mobile station 300") 300, and communications between the base station 200 and the mobile station 300 are performed through the relay station 100. Through this, even a terminal that is unable to communicate directly with the base station 200 (for example, mobile station 300) can communicate with the base station 200 through the relay station 100. Further, a mobile station 310 is a mobile station that is connected to the base station 200.

The wireless relay system shown in FIG. 1 performs a time-division relay (TD relay). As an example, possible two-hop relay from the base station 200 to the relay station 100 and from the relay station 100 to the mobile station 300 may be considered. However, in this embodiment, the TD relay can be applied to two or more hops.

[Explanation of SRS]

The SRS is a signal for measuring the channel quality of a broad band. As the mobile station transmits the SRS to the base station, the base station measures the channel quality of a resource block (RB) through which the SRS has been transmitted and refers to the measured channel quality in order to allocate resources to the mobile station. The SRS is placed in the SC-FDMA symbol #13. In the case of transmitting the SRS, the mobile station transmits a PUCCH and a PUSCH on the SC-FDMA symbols #0 to #12, and transmits the SRS on the SC-FDMA symbol #13.

The SRS configuration includes a cell specific SRS subframe configuration and a UE specific SRS configuration.

First, as subframes in which the base station (relay station in a relay station cell) is likely to receive the SRS, the cell specific SRS subframe configuration is determined for each cell, and the cell specific SRS subframe configuration is notified from the base station (relay station in the relay station cell) to the mobile station as a control signal of an upper layer.

Next, among the subframes included in the determined cell specific SRS configuration, a UE specific SRS configuration is determined, and SRS transmission interval information and transmission subframe offset information are notified from the base station (relay station in the relay station cell) to the mobile station as the determined UE specific SRS configuration information.

The mobile station transmits the SRS to the subframe allocated to the UE specific SRS configuration. However, in the SRS transmittable subframe allocated for each cell, the mobile station transmits a PUCCH and a PUSCH on the SC-FDMA symbols #0 to #12 even without the SRS transmission of the local station, and does not transmit the SRS on the SC-FDMA symbol #13 to avoid interference with the SRS.

Figure 16:
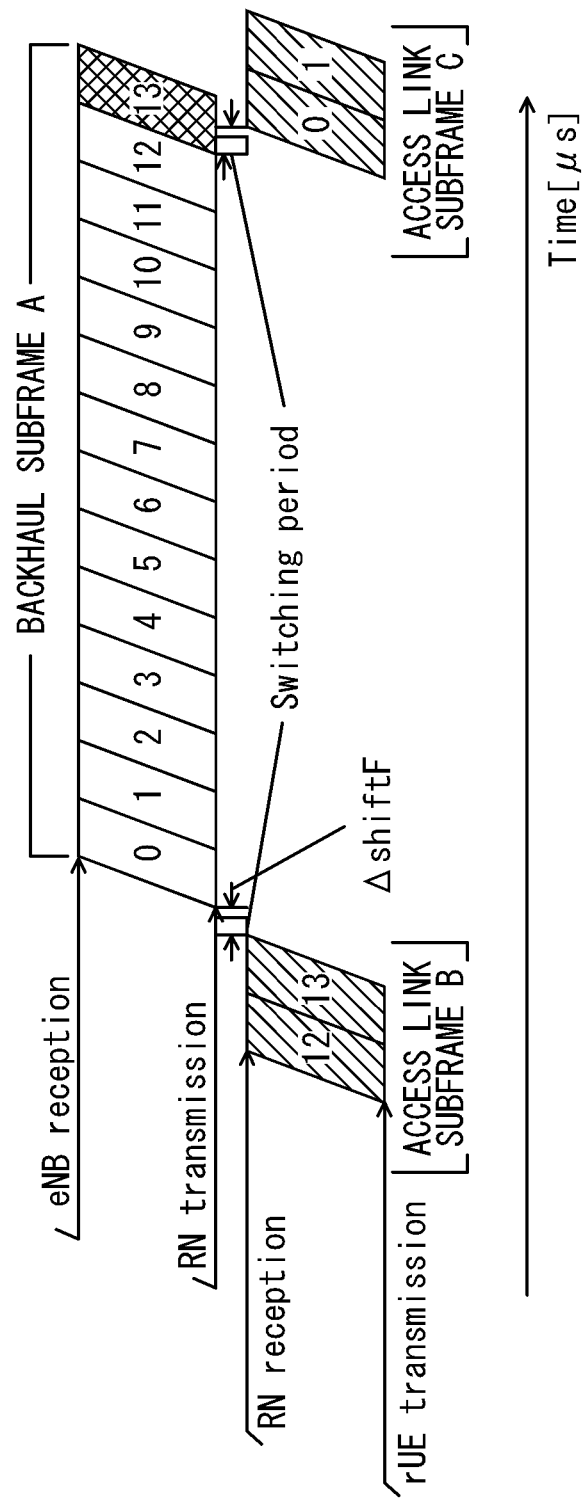
FIG. 16 is a diagram explaining an example [2] of preparing a guard period.
Figure 17:
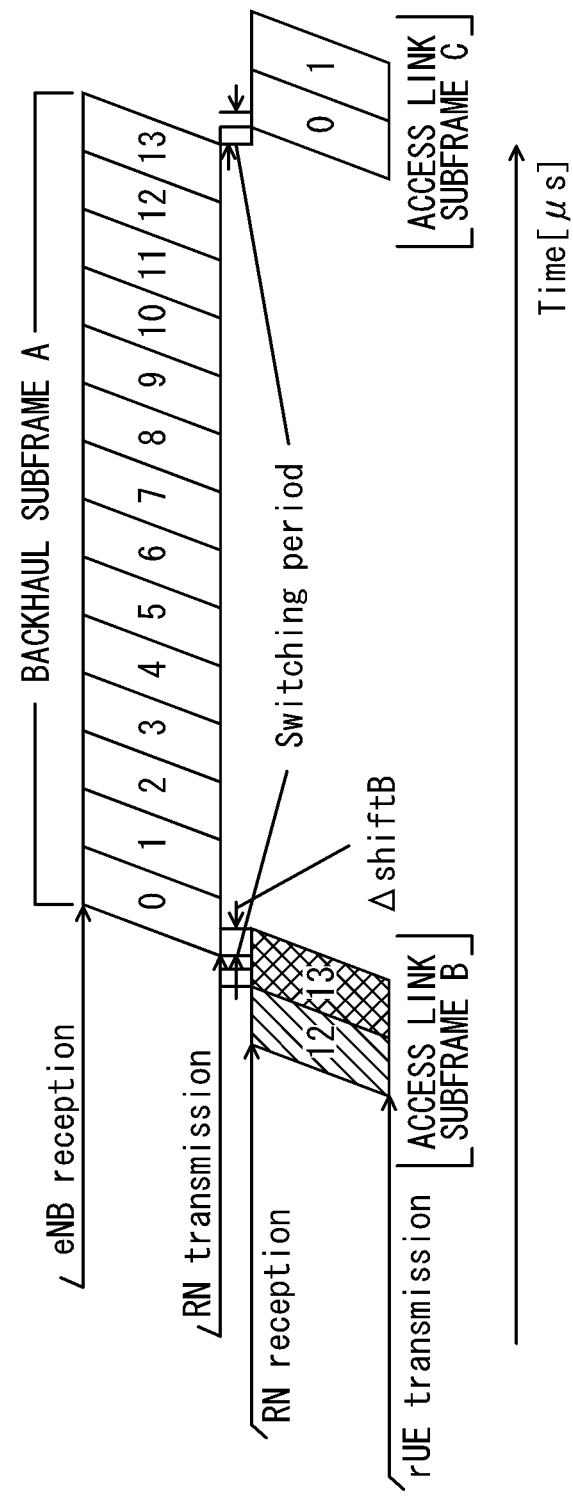
FIG. 17 is a diagram explaining an example [3] of preparing a guard period.

As described above, in the example [2] of preparing the guard period as shown in FIG. 16 (Case B), the relay station 30 is unable to transmit the SRS on the SC-FDMA symbol #13. Accordingly, it may be considered to transmit the SRS in a subframe (SFN#N−1) immediately previous to the subframe allocated to the backhaul subframe (SFN#N).

That is, since the relay station transmits the SRS to the base station in SFN#N, SFN#(N−1) is set as a subframe to transmit the SRS of the relay station in the cell of the base station. Further, since the relay station is unable to receive the SC-FDMA symbol #13 in the cell of the relay station, the relay station cell specific SRS is set to a subframe immediately previous to the subframe allocated to the backhaul subframe even in the relay station cell. However, the relay station cell specific SRS is not allocated with the UE specific SRS, and is set so that the SC-FDMA symbol #13 becomes free.

As described above, in the subframes immediately previous to the backhaul subframes, it is necessary to set the cell specific SRS configuration in both the base station cell and the relay station cell. In the subframe in which the cell specific SRS configuration has been set, the SC-FDMA symbol #13 is unable to be used for the transmission of the PUCCH and PUSCH. Particularly, if there are a large number of subframes that are used in the backhaul subframes, the probability that the SC FDMA symbol #13 is unable to be used for the PUCCH and PUSCH is increased to deteriorate the utilization efficiency of resources.

Accordingly, in the wireless relay system according to the first embodiment, the relay station 100 changes the switching timing from reception from the mobile station 30 to the local station to transmission from the local station to the base station 200 for each subframe. Further, the relay station 100 determines whether to allocate the SRS to the subframe immediately previous to the backhaul subframe as a reference switching.

Figure 2:
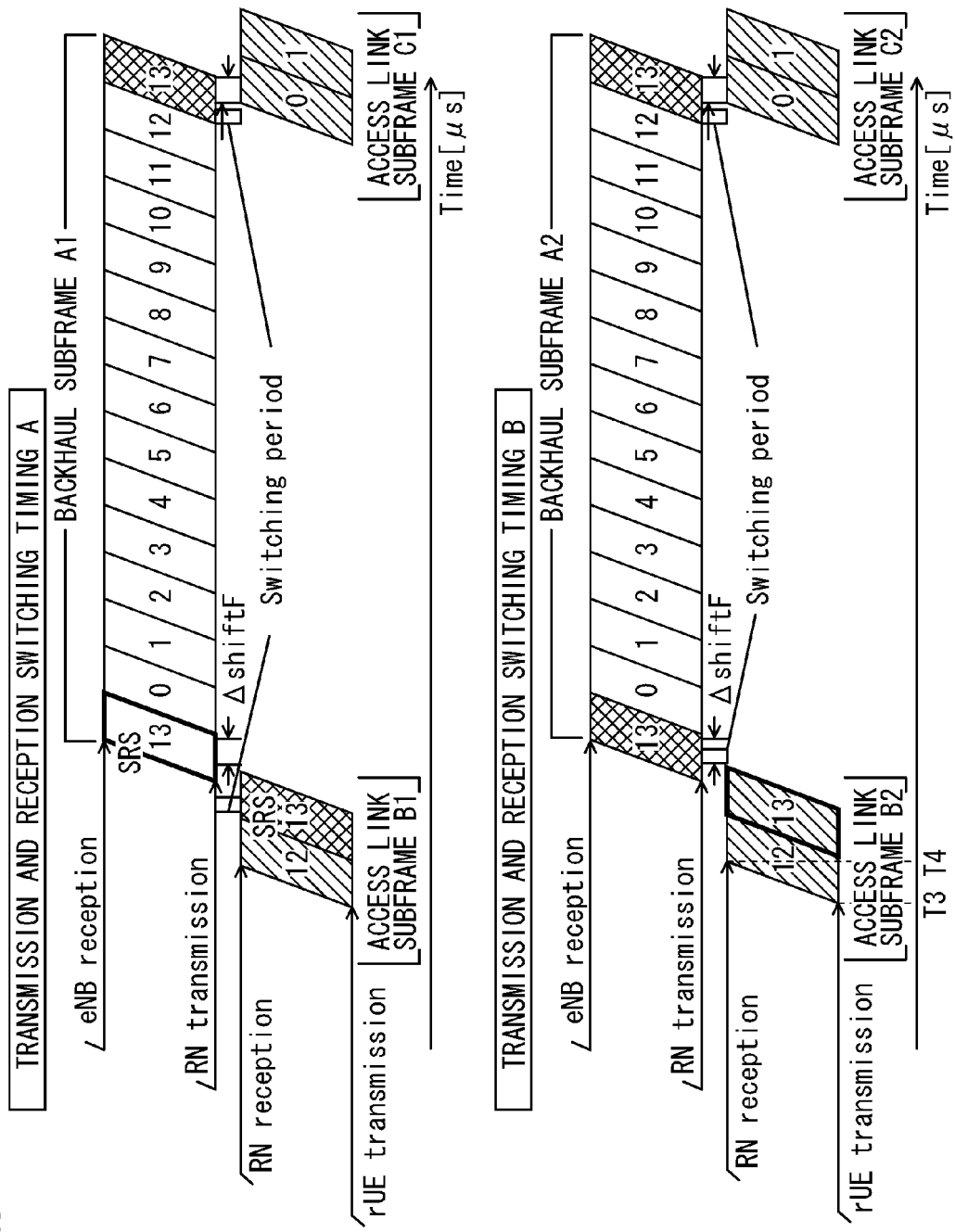
FIG. 2 is a diagram explaining the timing to switch transmission and reception through a relay station 100.

Next, referring to FIG. 2, the reference to switch transmission and reception through the relay station 100 will be described. FIG. 2 is a diagram explaining the timing to switch transmission and reception through the relay station 100.

In FIG. 2, a period between arrows indicated by Δshift F is a guard period. Further, a switching period in the drawing indicates time taken for the relay station 100 to perform switching from transmission to reception or switching from reception to transmission.

Further, in FIG. 2, rUE transmission indicates the transmission timing of the mobile station 300 connected to the relay station 100 to the relay station 100, RN reception indicates the reception timing of the relay station 100 from the mobile station 300, RN transmission indicates the transmission timing of the relay station 100 to the base station 200, and eNB reception indicates the reception timing of the base station 200 from the relay station 100.

Further, in FIG. 2, tilting blocks denoted by SC-FDMA symbols #0 to #13 (in the drawing, # is omitted and only numerals are denoted) indicate the propagation delay of symbols.

Further, in FIG. 2, tilting blocks denoted by SC-FDMA symbols #0 to #13 (in the drawing, # is omitted and only numerals are denoted) indicate the propagation delay of symbols. For example, in FIG. 2, the symbols transmitted from the mobile station 300 to the relay station 100 at time T4 are received in the relay station 100 at time T5.

First, if the SRS is transmitted on the SC-FDMA symbol #13 in the subframe immediately previous to the backhaul subframe A1 for performing communications between the base station 200 and the local station as the first transmission and reception switching timing (transmission and reception switching timing A in FIG. 2), the relay station 100 receives the SC-FDMA symbol #12 of the access link subframe B1 from the mobile station 300, and then switches to transmission. Because of this, in the relay station 100, the UL reception start timing of the access link for performing communications between the mobile station 300 and the local station may be shifted forward from the UL transmission end timing of the backhaul for Δshift F. After the switching from reception to transmission, the relay station 100 transmits the SRS to the base station 200.

Accordingly, although the SC-FDMA symbol #13 is set to the SRS symbol in the relay station cell, the SRS transmission is not allocated in the mobile station 300 connected to the relay station 100. That is, in the access link subframe (access link subframe B1 in FIG. 2), the SC-FDMA symbol #13 (shaded block in FIG. 2) becomes a fake SRS in which the SRS has not been set, and all mobile stations connected to the relay station 100 do not transmit the SC-FDMA symbol #13.

Next, if the SRS is not transmitted on the SC-FDMA symbol #13 in the subframe immediately previous to the backhaul subframe A2 for performing communications between the base station 200 and the local station as the second transmission and reception switching timing (transmission and reception switching timing B in FIG. 2), the relay station 100 receives the SC-FDMA symbol #13 of the access link subframe B2 from the mobile station 300, and then switches to transmission. Because of this, in the relay station 100, the UL reception start timing of the access link for performing communications between the mobile station 300 and the local station may be shifted forward from the UL transmission end timing of the backhaul for Δshift F. After the switching from reception to transmission, the relay station 100 transmits the SC-FDMA symbols #0 to #12 (in the case of a normal CP length) to the base station 200.

As described above, the relay station 100 according to this embodiment switches the transmission and reception switching timing A and B (see FIG. 2) for every subframe. Because of this, the relay station 100 may transmit the SRS through sacrificing the last SC-FDMA symbol of the access link only in the subframe on which the SRS transmission is necessary among the backhaul subframes, and may use the last SC-FDMA symbol to receive the PUCCH, PUSCH, or SRS in the subframe on which the SRS transmission is unnecessary. Accordingly, the relay station 100 according to this embodiment can improve the utilization efficiency of resources.

Further, in the transmission and reception switching timing A and the transmission and reception switching timing B, the relay station 100 according to this embodiment may transmit the PUCCH and PUSCH using the SC-FDMA symbols #0 to #12 (in the case of a normal CP). Accordingly, it is not necessary to newly define a format for the backhaul subframes.

Further, the relay station 100 sets the same subframe as the subframe instructed by the base station 200 to transmit the SRS as the SRS of the relay station cell, and makes the mobile station 300 under the relay station not transmit the SC-FDMA symbol #13.

[Operation Example of Relay Station 100]

Figure 3:
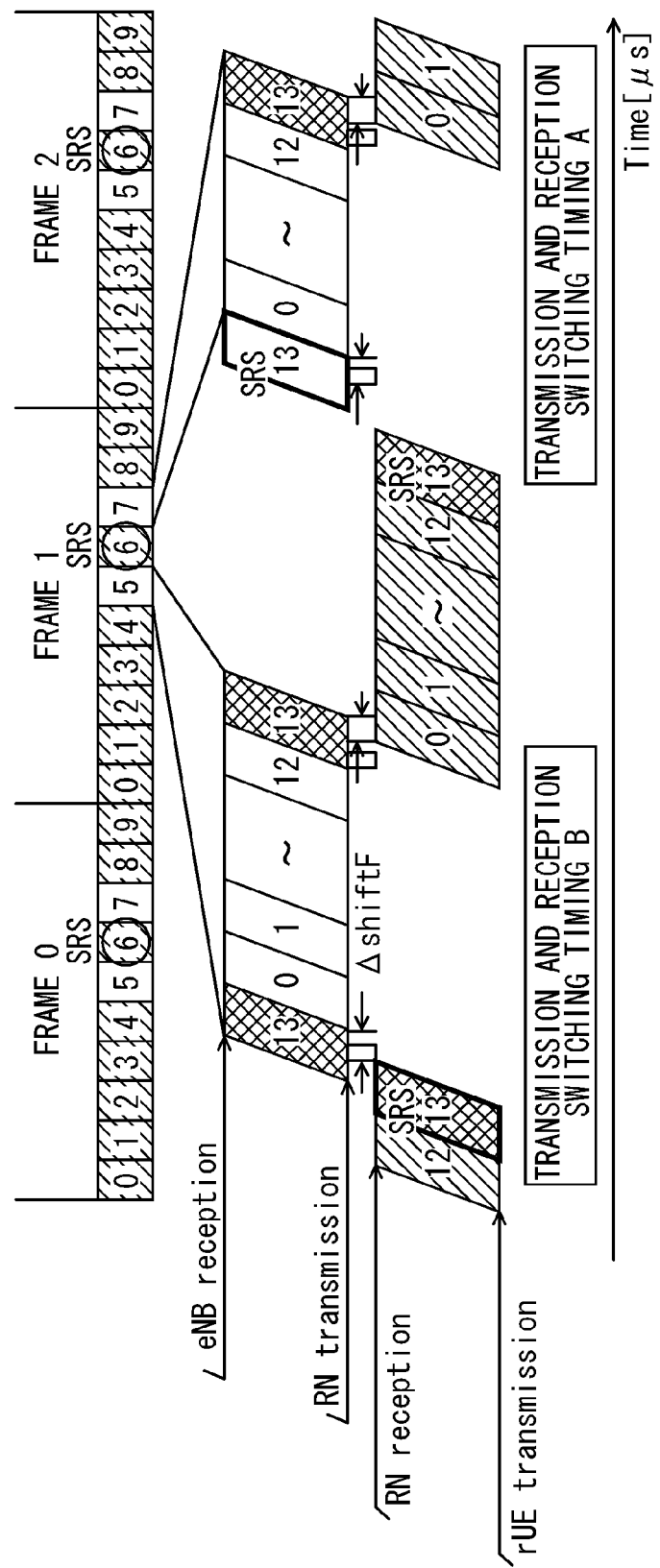
FIG. 3 is a diagram explaining a transmission and reception switching operation of a relay station 100.

Next, referring to FIG. 3, the transmission and reception switching operation of the relay station 100 will be described. FIG. 3 is a diagram explaining the transmission and reception switching operation of the relay station 100. In the drawing, the horizontal axis represents time [μs].

Further, in respective frames 0, 1, and 2 in FIG. 3, subframes #5 and #7 (backhaul subframes) indicate communications from the relay station 100 to the base station 200, and other subframes indicate communications from the mobile station 300 to the relay station 100. Each subframe includes SC-FDMA symbols #0 to #13. The symbol length of each SC-FDMA symbol is about 71.4 [ms].

Further, in FIG. 3, a period between arrows indicated by Δshift F represents a guard period. The guard period includes time taken for the relay station 100 to perform switching from transmission to reception or switching from reception to transmission.

Further, in FIG. 3, rUE transmission indicates the transmission timing of the mobile station 300, which is connected to the relay station 100, to the relay station 100, RN reception indicates the reception timing of the relay station 100 from the mobile station 300, RN transmission indicates the transmission timing of the relay station 100 to the base station 200, and eNB reception indicates the reception timing of the base station 200 from the relay station 100.

Further, in FIG. 3, tilting blocks denoted by SC-FDMA symbols #0 to #13 (in the drawing, # is omitted and only numerals are denoted) indicate the propagation delay of symbols.

The relay station 100 can control the reception timing of the relay station 100 from the mobile station 300 (or the transmission timing of the mobile station 300, which is connected to the relay station 100, to the relay station 100) that is indicated by RN reception. Further, the reception timing of the base station 200 from the relay station 100 (or the transmission timing of the relay station 100 to the base station 200) has been set in the base station 200.

Further, the base station 200 sets the specific SRS of the relay station 100 at an interval of 10 msec.

Here, if it is assumed that "the subframe that transmits the SRS" is the subframe #6, from the point of view of the subframe #7 immediately after the subframe #6, the SRS is transmitted on the subframe #6 immediately before the subframe #7. Further, from the point of view of the subframe #7, the subframe #4 immediately before the subframe #5 is not the subframe on which the SRS is transmitted. Accordingly, as shown in FIG. 3, the relay station 100 uses the transmission and reception switching timing B as shown in FIG. 2 on the subframe #5 on which the subframe #4 immediately before the subframe #5 is not the subframe that transmits the SRS. Further, in the subframe #7 on which the subframe #6 immediately before the subframe #7 is the subframe that transmits the SRS, the relay station 100 uses the transmission and reception switching timing A.

As described above, the relay station 100 according to this embodiment switches the transmission and reception switching timing A and B for every subframe. Because of this, the relay station 100 may transmit the SRS through sacrificing the last SC-FDMA symbol of the access link only in the subframe (subframe #7 in FIG. 3) on which the SRS transmission is necessary among the backhaul subframes, and may use the last SC-FDMA symbol to receive the PUCCH, PUSCH, or SRS in the subframe (subframe #5 in FIG. 3) on which the SRS transmission is unnecessary. Accordingly, the relay station 100 according to this embodiment can improve the utilization efficiency of resources.

Figure 4:
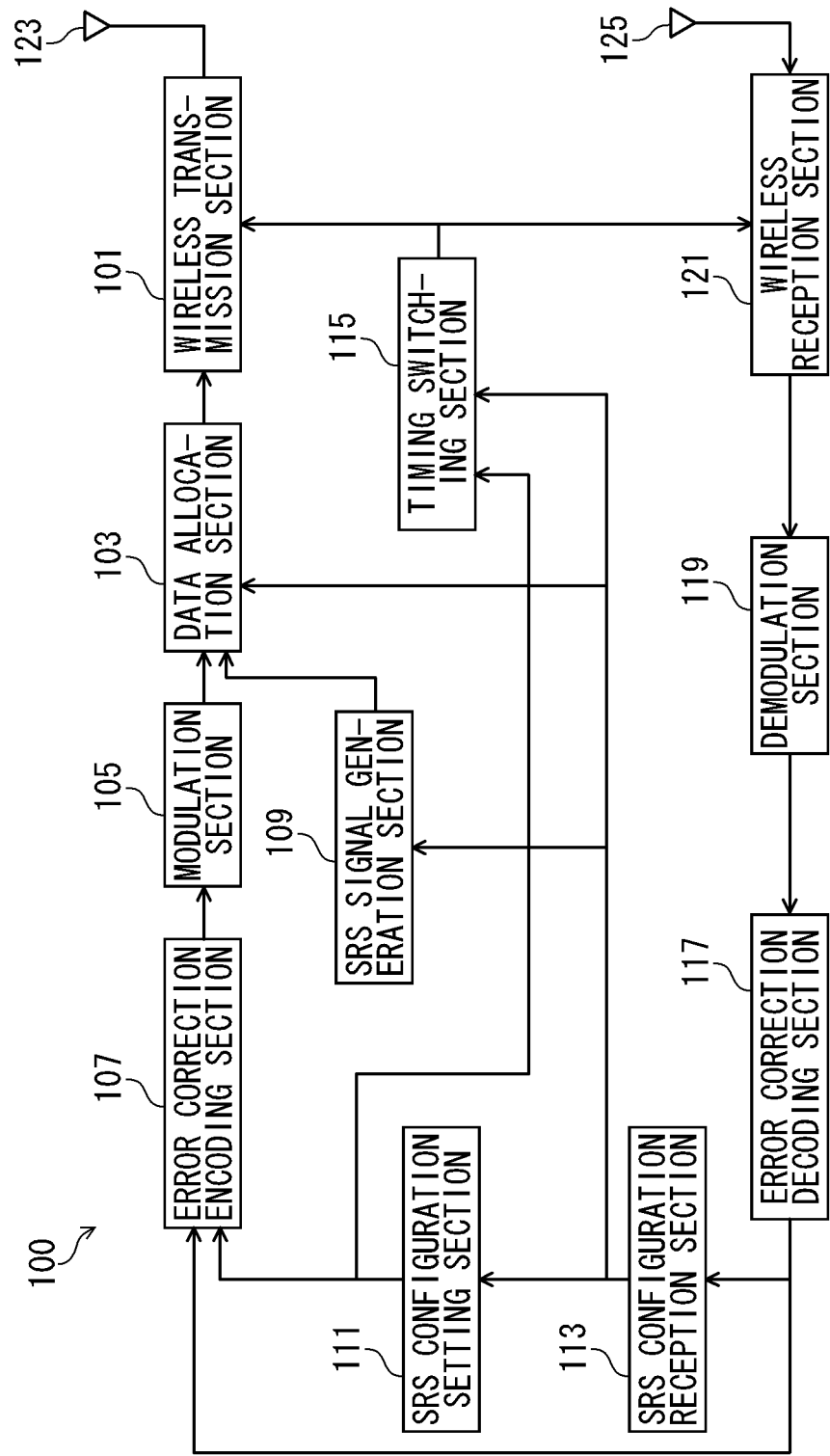
FIG. 4 is a block diagram illustrating the configuration of a relay station 100.

Next, referring to FIG. 4, the configuration of the relay station 100 will be described. FIG. 4 is a block diagram illustrating the configuration of the relay station 100. The relay station 100 shown in FIG. 4 includes a wireless transmission section 101, a data allocation section 103, a modulation section 105, an error correction encoding section 107, an SRS signal generation section 109, an SRS configuration setting section 111, an SRS configuration reception section 113, a timing switching section 115, an error correction decoding section 117, a demodulation section 119, a wireless reception section 121, a transmission antenna 123, and a reception antenna 125. Further, referring to FIG. 4, a case of relaying an uplink (UL) signal will be described.

The wireless reception section 121 receives a signal from the base station 200 through the reception antenna 125, and outputs the received signal to the demodulation section 119 through wireless processing such as a down converter.

The demodulation section 119 demodulates the signal input from the wireless reception section 121, and outputs the demodulated signal to the error correction decoding section 117.

The error correction decoding section 117 decodes the signal input from the demodulation section 119, and outputs data to the error correction encoding section 107 or the SRS configuration reception section 113. Base station cell specific SRS configuration information among the decoded data is processed through the error correction encoding section 107 and the modulation section 105, and is output to the data allocation section 103. Further, relay station specific SRS configuration information among the decoded data is processed through the SRS configuration reception section 113, and is output to the data allocation section 103, the SRS signal generation section 109, the SRS configuration setting section 111, and the timing switching section 115.

Here, by the base station cell specific SRS configuration information, which is a control signal transmitted from the base station 200, and the relay station specific SRS configuration information among the decoded data, the relay station 100 recognizes the subframe that does not transmit the SC-FDMA symbol #13 and the subframe of the SRS that is transmitted to the base station 200.

The SRS configuration setting section 111 determines the relay station cell specific SRS configuration and the UE specific SRS configuration connected to the relay station 100, and outputs the determined information to the error correction encoding section 107 and the timing switching section 115. The SRS configuration setting section 111 determines the SRS configuration so that the subframe that is equal to the relay station specific SRS configuration designated by the base station 200 is included as the relay station cell specific SRS configuration.

The error correction encoding section 107 performs error correction encoding of the data signal and the relay station cell specific SRS configuration information, and outputs the resultant signal to the modulation section 105.

The modulation section 105 modulates the signal output from the error correction encoding section 107, and outputs the modulated signal to the data allocation section 103.

The SRS signal generation section 109 generates the SRS signal that the relay station 100 outputs to the base station 200 based on the relay station cell specific SRS configuration information that is received from the base station 200, and outputs the SRS signal to the data allocation section 103.

The data allocation section 103 allocates the SRS signal generated by the SRS signal generation section 109 to a resource block (RB) in the subframe that transmits the SRS according to the relay station cell specific SRS configuration information received from the base station 200, and outputs the allocated SRS signal to the wireless transmission section 101. Further, the data allocation section 103 allocates the data of the signal modulated by the modulation section 105 to the resource block (RB) in the subframe that transmits the data according to the relay station cell specific SRS configuration information received from the base station 200, and outputs the allocated data to the wireless transmission section.

In this embodiment, the SC-FDMA symbol #13 of the UL backhaul subframe is used in the guard period, and thus the relay station 100 does not transmit the signal to the base station. In the case where the UL backhaul subframes are successive, the relay station 100 can transmit the signal on the SC-FDMA symbol #13 in the subframe in which switching with the access link does not occur. However, in the case where the base station specific SRS has been determined according to the base station cell specific SRS configuration information, but the relay station cell specific SRS has not been allocated, the relay station 100 does not transmit the signal on the SC-FDMA symbol #13.

The timing switching section 115 changes the timing to switch from reception to transmission according to the relay station cell specific SRS configuration set by the base station 200 and the relay station cell specific SRS configuration determined by the local station.

Here, in the subframe in which the SRS transmission has been instructed by the base station 200, the timing switching section 115 receives the SC-FDMA symbol #12 of the mobile station 300, and then switches to transmission. Then, the timing switching section 115 instructs the wireless transmission section 101 to transmit the SRS to the base station 200. In the subframe in which the SRS transmission has not been instructed by the base station 200, the timing switching section 115 receives the SC-FDMA symbol #13 of the mobile station 300, and then switches to transmission. Further, the switching timing may be changed by the instruction of the base station 200.

The wireless transmission section 101 performs wireless processing such as up-converter with respect to the signal after the modulation, and transmits the processed signal to the base station 200 through the transmission antenna 123.

Second Embodiment

Figure 5:
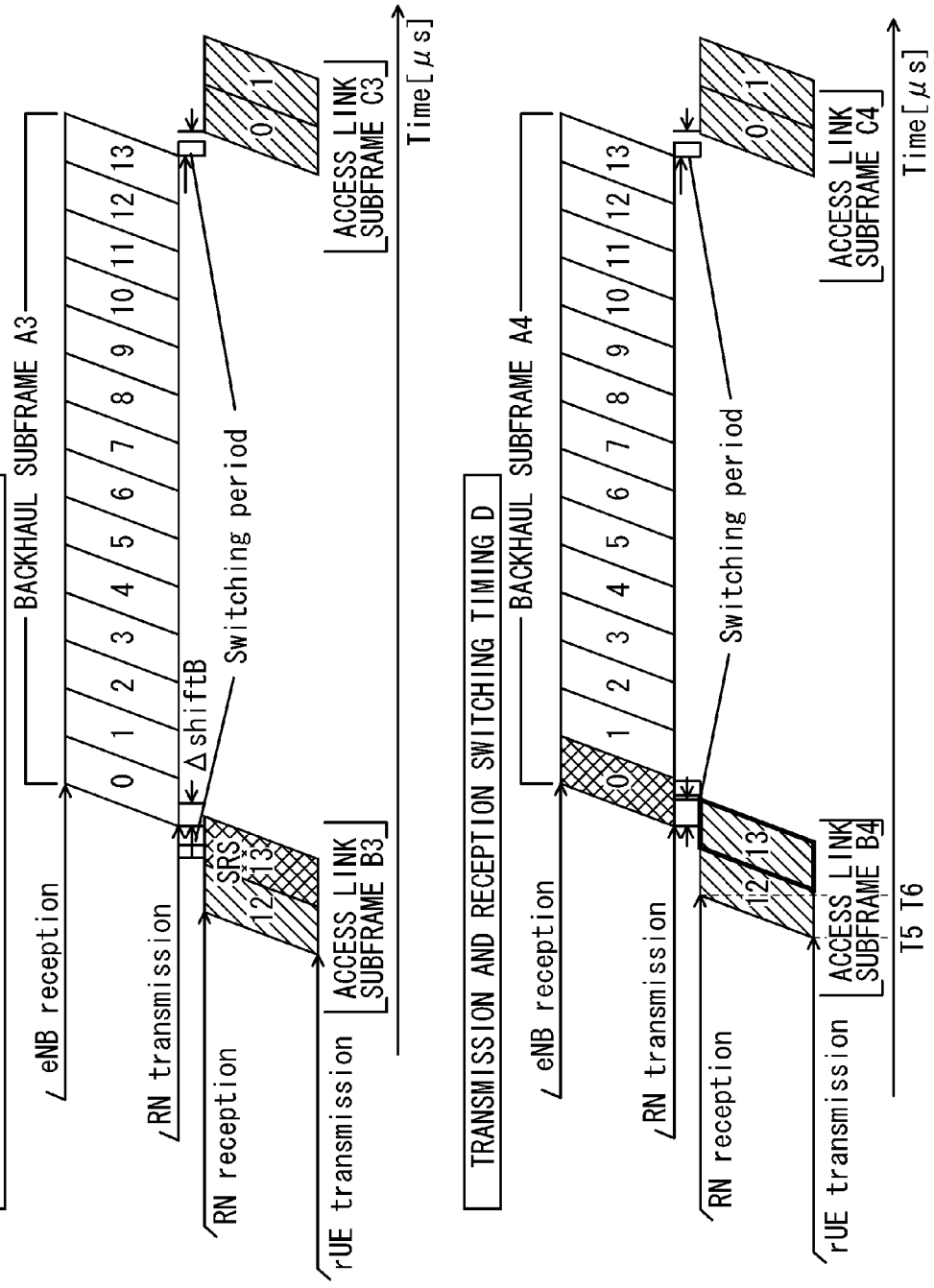
FIG. 5 is a diagram explaining the timing to switch transmission and reception through a relay station 400.
Figure 6:
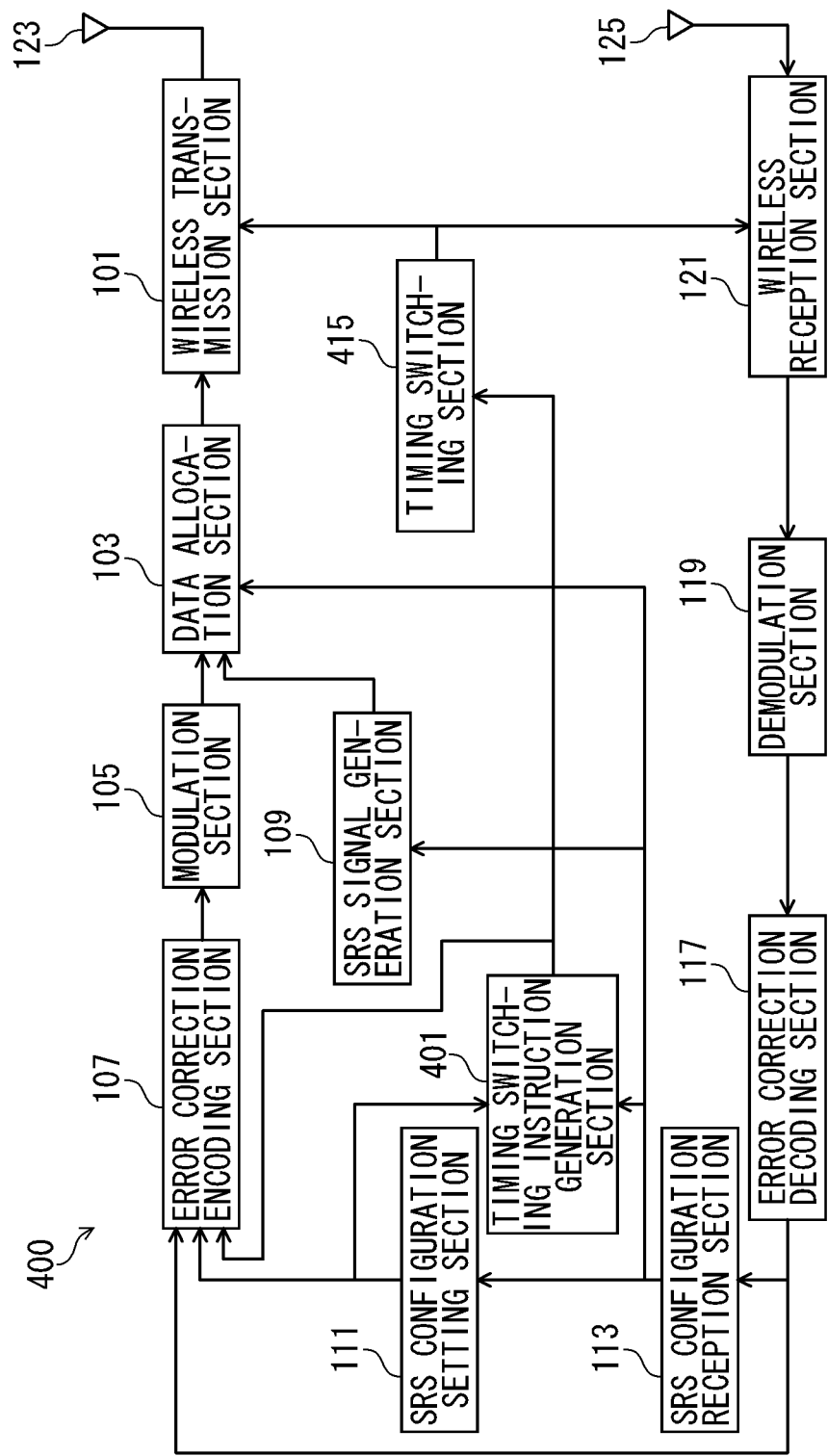
FIG. 6 is a block diagram illustrating the configuration of a relay station 400.
Figure 7:
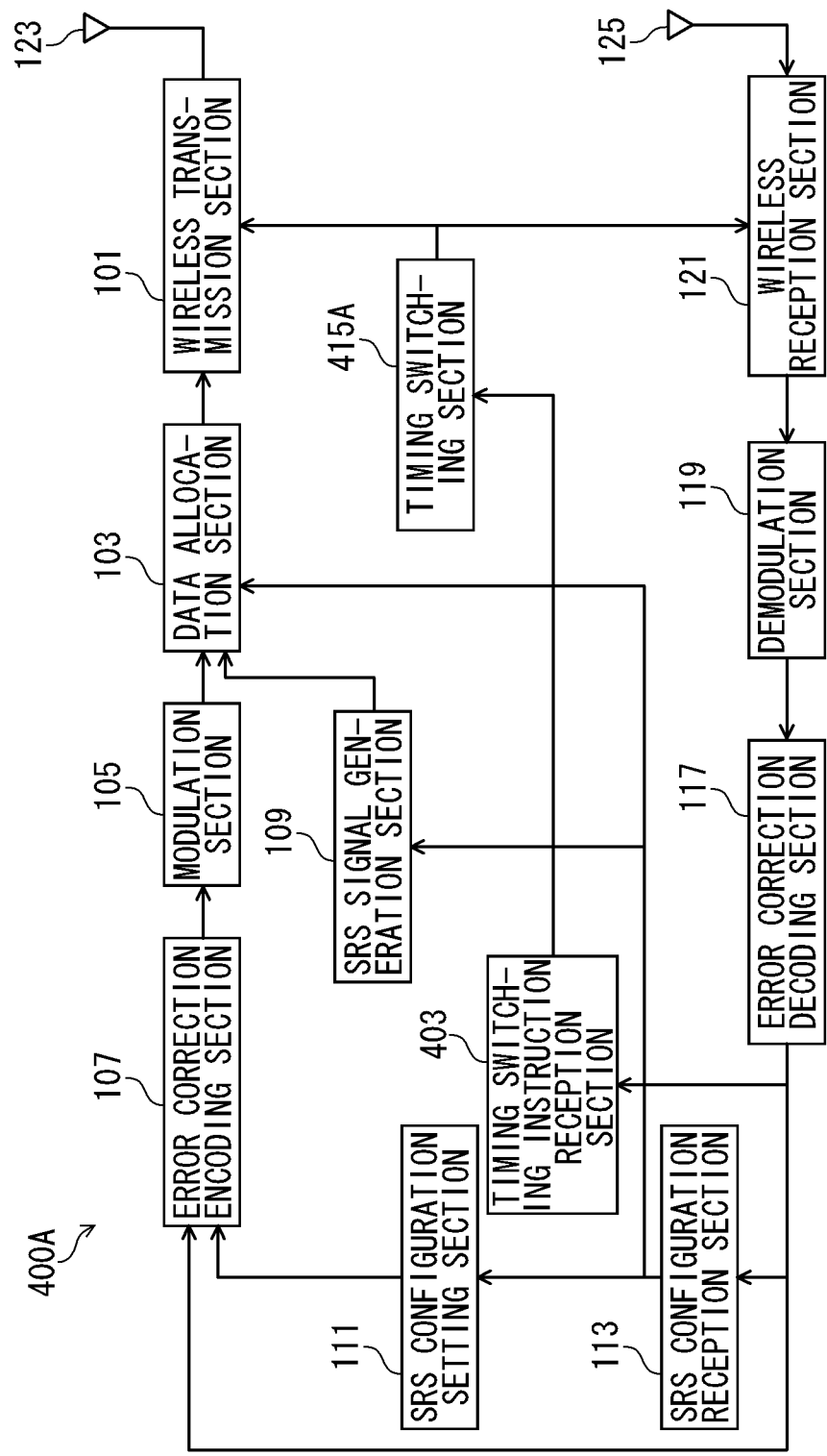
FIG. 7 is a block diagram illustrating the configuration of a relay station 400A.

Referring to FIGS. 5 to 7, a relay station 400 according to the second embodiment will be described.

The second embodiment refers to a wireless relay system in which the relay station 100 according to the wireless relay system as shown in FIG. 1 has been replaced by the relay station 400. A terminal that is unable to communicate directly with the base station 200 (for example, mobile station 300) can communicate with the base station 200 through the relay station 400.

In the same manner as the first embodiment, the wireless relay system according to the second embodiment performs a time-division relay (TD relay). As an example, possible two-hop relay from the base station 200 to the relay station 400 and from the relay station 400 to the mobile station 300 may be considered. However, in this embodiment, the TD relay can be applied to two or more hops.

In the wireless relay system according to the second embodiment, the relay station 400 changes the switching timing from reception from the mobile station 300 to the local station to transmission from the local station to the base station 200 for each subframe. Further, in the same manner as the first embodiment, the relay station 100 determines whether to allocate the SRS to the subframe immediately previous to the backhaul subframe as a reference switching.

Next, referring to FIG. 5, the reference to switch transmission and reception through the relay station 400 will be described. FIG. 5 is a diagram explaining the timing to switch transmission and reception through the relay station 400. In the drawing, the horizontal axis represents time [μs].

In FIG. 5, rUE transmission indicates the transmission timing of the mobile station 300 connected to the relay station 400 to the relay station 400, RN reception indicates the reception timing of the relay station 400 from the mobile station 300, RN transmission indicates the transmission timing of the relay station 400 to the base station 200, and eNB reception indicates the reception timing of the base station 200 from the relay station 400.

Further, in FIG. 5, tilting blocks denoted by SC-FDMA symbols #0 to #13 (in the drawing, # is omitted and only numerals are denoted) indicate the propagation delay of symbols. For example, in FIG. 5, the symbols transmitted from the mobile station 300 to the relay station 400 at time T5 are received in the relay station 400 at time T6.

Here, the relay station 400 can control the reception timing of the local station from the mobile station 300, which is indicated by RN reception (or the transmission timing of the mobile station 300 connected to the local station to the local station). Further, the reception timing of the base station 200 from the local station (or the transmission timing of the local station to the base station 200) is set in the base station 200.

First, the third transmission and reception switching timing (transmission and reception switching timing C in FIG. 5) is used when the relay station 400 transmits the SC-FDMA symbols #0 to #13 of the backhaul subframe A3 to the base station 200 (including the case where the relay station 400 wants to transmit the PUCCH). The relay station 400 sets the SRS in the cell of the local station (relay station), receives, from the mobile station 300, the SC-FDMA symbol #12 of the access link subframe B3 to perform communications between the mobile station 300 and the local station, and then switches to transmission of the backhaul to perform communications between the base station 200 and the local station. Because of this, in the relay station 400, the UL reception start timing of the access links (access link subframes B3 and C3 in the drawing) for performing communications between the mobile station 300 and the local station may be shifted backward from the UL transmission end timing of the backhaul (backhaul subframes A3 in the drawing) for performing communications between the base station 200 and the local station for Δshift B. In the subframes set at the third transmission and reception switching timing, all the PUCCH and PUSCH, which have been designed for the mobile station, may be applied as they are.

Further, although the SC-FDMA symbol #13 of the access link subframe (access link subframe B3 in FIG. 5) is set to the SRS symbols in the relay station cell, the SRS transmission is not allocated in the mobile station 300 connected to the relay station 400. That is, in the access link subframe (access link subframe B3 in FIG. 5), the SC-FDMA symbol #13 (shaded block in FIG. 5) becomes a fake SRS in which the SRS has not been set.

Next, the fourth transmission and reception switching timing (transmission and reception switching timing D in FIG. 5) is used when the relay station 400 wants to transmit the SC-FDMA symbol #13 of the access link subframe (access link subframe B4 in FIG. 5) to the mobile station 300 connected to the local station (including the case where the relay station 400 wants to perform SRS transmission of the SC-FDMA symbol #13).

The relay station 400 receives a data symbol or the SRS of the SC-FDMA symbol #13 of the access link subframe B4 from the mobile station 300, and then switches to transmission of the backhaul. At this time, in the case where the relay station 400 transmits the PUCCH, a format for the PUCCH in which the SC-FDMA symbol #0 is not used is necessary. The format may be newly defined, and in the case of using the fourth transmission and reception switching timing (transmission and reception switching timing D in FIG. 5) without defining the format, a rule may be used to multiplex information, which is necessarily transmitted to the PUCCH, to the PUSCH.

Since the relay station 400 according to the second embodiment uses both the third transmission and reception switching timing and the fourth transmission and reception switching timing, it switches the third transmission and reception switching timing and the fourth transmission and reception switching timing for every subframe. Through switching the two transmission and reception switching timings, (1) in the case of using only the third transmission and reception switching timing, the relay station 400 is able to transmit the SC-FDMA symbol #0 which it is normally unable to transmit, and (2) in the case of using only the fourth transmission and reception switching timing, the relay station 400 can prevent the local station from switching to transmission despite the fact that the SRS of the mobile station although intervals between the setting of the backhaul subframe and the setting of the SRS of the mobile station under the relay station do not match each other and the mobile station connected to the local station transmits the SRS.

Next, referring to FIGS. 6 and 7, switching timing setting methods (1) and (2) for switching the above-described third and fourth transmission and reception switching timings will be described.

<Setting Method (1)>

In the setting method 1, the relay station 400 determines which of the third transmission and reception switching timing and the fourth transmission and reception switching timing is to be used for each subframe, and notifies the base station 200 of the result of the determination.

The relay station 400 determines the subframe for transmitting the SRS to the mobile station under the local station (relay station) according to the position of the backhaul subframe instructed by the base station 200, the number of mobile stations under the local station (relay station), and the channel quality state between the local station (relay station) and the mobile station. If the SRS transmission of the mobile station under the local station (relay station) and the subframe immediately previous to the backhaul subframe collide with each other, the relay station 400 notifies the base station 200 that the timing D is used for the SRS transmission and the timing C is used for others. Further, with respect to the above-described position of the backhaul subframe, the relay station 400 has already been instructed by the base station 200.

Here, referring to FIG. 6, the configuration of the relay station 400 for performing the setting method (1) will be described. FIG. 6 is a block diagram illustrating the configuration of the relay station 400. The configuration of the relay station 400 shown in FIG. 6 differs from the configuration of the relay station 100 shown in FIG. 4 on the point that the relay station 400 includes a timing switching instruction generation section 401 and a timing switching section 415. The detailed description of the common configurations will be omitted.

The timing switching instruction generation section 401 generates timing switching instruction information from local station (relay station) specific SRS configuration information, local station (relay station) cell specific SRS configuration information, and mobile station specific SRS configuration information connected to the local station (relay station), which are determined by the SRS configuration setting unit 111. Further, the timing switching instruction generation section 401 outputs the generated timing switching instruction information to the error correction encoding section 107 and the timing switching section 415.

The timing switching section 415 switches the above-described third transmission and reception switching timing and the fourth transmission and reception switching timing based on the timing switching instruction information.

Further, in the subframe in which the relay station 400 transmits the PUCCH to the base station 200, the third transmission and reception switching timing may be used, and in the subframe in which the relay station 400 transmits the PUCCH, the fourth transmission and reception switching timing may be used.

<Setting Method (2)>

Here, referring to FIG. 7, the configuration of a relay station 400A for setting the setting method (2) will be described as a modified example of the relay station 400. In the setting method (2), the base station 200 notifies the relay station 400A which of the third transmission and reception switching timing and the fourth transmission and reception switching timing is to be used for each subframe. Further, the relay station 400A sets the SRS transmission subframe of the mobile station 300 of the relay station cell and an interval between the subframes so that the subframe corresponding to the third transmission and reception switching timing and the SRS transmission subframe for transmitting the SRS of the mobile station connected to the local station (relay station) do not overlap each other.

FIG. 7 is a block diagram illustrating the configuration of the relay station 400A. The configuration of the relay station 400A shown in FIG. 7 differs from the configuration of the relay station 100 shown in FIG. 4 on the point that the relay station 400A includes a timing switching instruction reception section 403 and a timing switching section 415A. The detailed description of the common configurations will be omitted.

The timing switching instruction reception section 403 receives timing switching information transmitted from the base station 200 and outputs the information to the timing switching section 415A.

The timing switching section 415A switches the third transmission and reception switching timing and the fourth transmission and reception switching timing based on the instruction from the base station.

Third Embodiment

Next, Referring to FIGS. 8 to 10, a relay station 700 according to the third embodiment will be described.

The third embodiment refers to a wireless relay system in which the relay station 100 according to the wireless relay system as shown in FIG. 1 has been replaced by the relay station 700. A terminal that is unable to communicate directly with the base station 200 (for example, mobile station 300) can communicate with the base station 200 through the relay station 400.

In the same manner as the first embodiment, the wireless relay system according to the third embodiment performs a time-division relay (TD relay). As an example, possible two-hop relay from the base station 200 to the relay station 700 and from the relay station 700 to the mobile station 300 may be considered. However, in this embodiment, the TD relay can be applied to two or more hops.

The relay station 700 according to this embodiment switches the third transmission and reception switching timing (transmission and reception switching timing C in FIG. 8) and a new fifth transmission and reception switching timing (transmission and reception switching timing E in FIG. 8) for each subframe.

Next, referring to FIG. 8, in the relay station 700 according to this embodiment, the two transmission and reception switching timings as described above will be described. FIG. 8 is a diagram explaining the timing to switch transmission and reception through the relay station 700.

Figure 8:
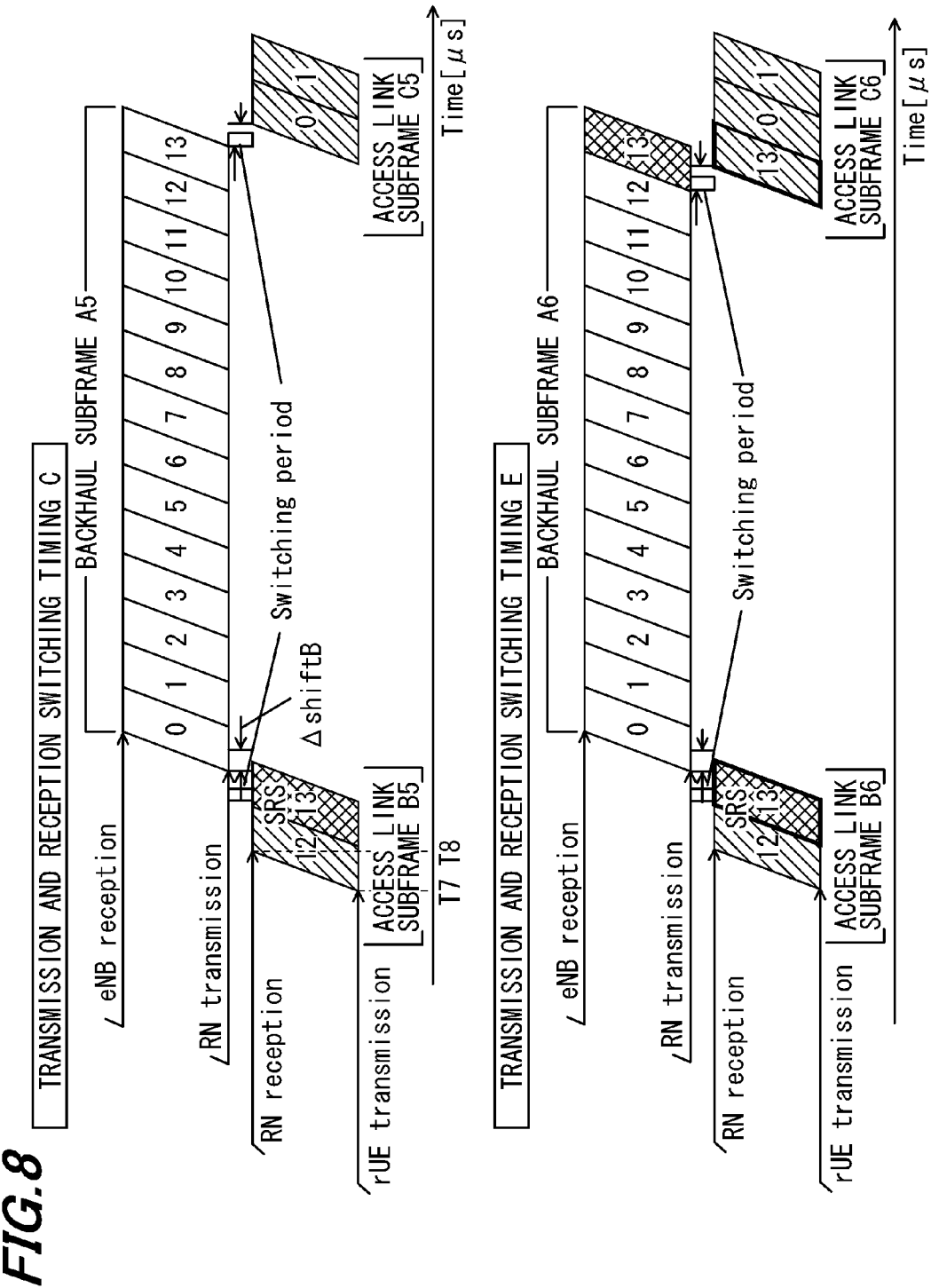
FIG. 8 is a diagram explaining the timing to switch transmission and reception through a relay station 700.

In FIG. 8, rUE transmission indicates the transmission timing of the mobile station 300 connected to the relay station 700 to the relay station 700, RN reception indicates the reception timing of the relay station 700 from the mobile station 300, RN transmission indicates the transmission timing of the relay station 700 to the base station 200, and eNB reception indicates the reception timing of the base station 200 from the relay station 700.

Further, in FIG. 8, a period between arrows indicated by Δshift F is a guard period. Further, a switching period in the drawing is time taken for the relay station 700 to switch from transmission to reception or to switch from reception to transmission.

Further, in FIG. 8, tilting blocks denoted by SC-FDMA symbols #0 to #13 (in the drawing, # is omitted and only numerals are denoted) indicate the propagation delay of symbols. For example, in FIG. 8, the symbols transmitted from the mobile station 300 to the relay station 700 at time T7 are received in the relay station 700 at time T8.

Here, the relay station 700 can control the reception timing of the relay station 700 from the mobile station 300, which is indicated by RN reception (or the transmission timing of the mobile station 300 connected to the relay station 700 to the relay station 700). Further, the reception timing of the base station 200 from the relay station 700 (or the transmission timing of the relay station 700 to the base station 200) is set in the base station 200.

Further, the base station 200 sets the specific SRS of the relay station 700 at an interval of 10 msec.

First, the third transmission and reception switching timing (transmission and reception switching timing C in FIG. 8) is used when the relay station 700 transmits the SC-FDMA symbols #0 to #13 of the backhaul subframe A5 to the base station 200 (including the case where the relay station 700 wants to transmit the PUCCH). The relay station 700 sets the SRS in the cell of the local station (relay station), receives, from the mobile station 300, the SC-FDMA symbol #12 of the access link subframe B5 to perform communications between the mobile station 300 and the local station, and then switches to transmission of the backhaul to perform communications between the base station 200 and the local station. Because of this, in the relay station 700, the UL reception start timing of the access links (access link subframes B5 and C5 in FIG. 8) for performing communications between the mobile station 300 and the local station may be shifted backward from the UL transmission end timing of the backhaul (backhaul subframes A5 in FIG. 8) for performing communications between the base station 200 and the local station for Δshift B. In the subframes set at the third transmission and reception switching timing, all the PUCCH and PUSCH, which have been designed for the mobile station, may be applied as they are.

Further, although the SC-FDMA symbol #13 of the access link subframe (access link subframe B5 in FIG. 8) is set to the SRS symbols in the relay station cell, the SRS transmission is not allocated in the mobile station 300 connected to the relay station 700. That is, in the access link subframe (access link subframe B5 in FIG. 8), the SC-FDMA symbol #13 (shaded block in FIG. 8) becomes a fake SRS in which the SRS has not been set.

Next, the fifth transmission and reception switching timing (transmission and reception switching timing E in FIG. 8) will be described. The fifth transmission and reception switching timing differs from the third transmission and reception switching timing as described above on the point that the fifth transmission and reception switching timing is the switching timing from the backhaul subframe to the access link subframe, that is, the switching timing from transmission to reception.

At the fifth transmission and reception switching timing, the relay station 700 switches to reception after transmitting the SC-FDMA symbol #12 of the backhaul subframe A6, and receives the SC-FDMA symbol #13 of the same subframe number as the backhaul subframe A6 in the access link subframe C6. That is, the relay station receives the SC-FDMA symbol in the access link subframe C6 of the next subframe.

As described above, the relay station 700 according to this embodiment switches the third transmission and reception switching timing (transmission and reception switching timing C in FIG. 8) and the fifth transmission and reception switching timing (transmission and reception switching timing E in FIG. 8). Because of this, the base station cell specific SRS configuration is set in the backhaul subframe, and in the case where the relay station specific SRS configuration has not been set, it is not necessary for the relay station 700 to transmit the SC-FDMA symbol #13. That is, in the backhaul subframe (backhaul subframe A6 in FIG. 8), the SC-FDMA symbol #13 becomes a fake SRS. Accordingly, the relay station 700 can receive the SC-FDMA symbol #13 of the access link subframe C6, and allocate the SC-FDMA symbol #13 of the access link subframe (access link subframe C6 in the drawing) to the mobile station specific SRS configuration under the relay station 700.

As described above, the relay station 700 according to this embodiment is unable to receive the SRS from the mobile station 300 in the subframe before the backhaul, but can receive the SRS of the mobile station 300 in the same subframe as the backhaul.

Further, the relay station 700 according to this embodiment can transmit the SRS and data to the base station 200 on the SC-FDMA symbol #13 at the third transmission and reception switching timing as described above. Accordingly, the relay station 700 according to this embodiment can set the subframe that adaptively transmits the SRS through the timing switching.

Further, in switching between the third transmission and reception switching timing and the fifth transmission and reception switching timing through the relay station 700 according to this embodiment, it does not occur that the SC-FDMA symbol #0 is unable to be transmitted, and thus the relay station 700 can operate without setting a new format of the PUCCH.

[Operation Example of Relay Station 700]

Next, referring to FIG. 9, the transmission and reception switching operation of the relay station 700 will be described. FIG. 9 is a diagram explaining the transmission and reception switching operation of the relay station 700. In the drawing, the horizontal axis represents time [μs].

Figure 9:
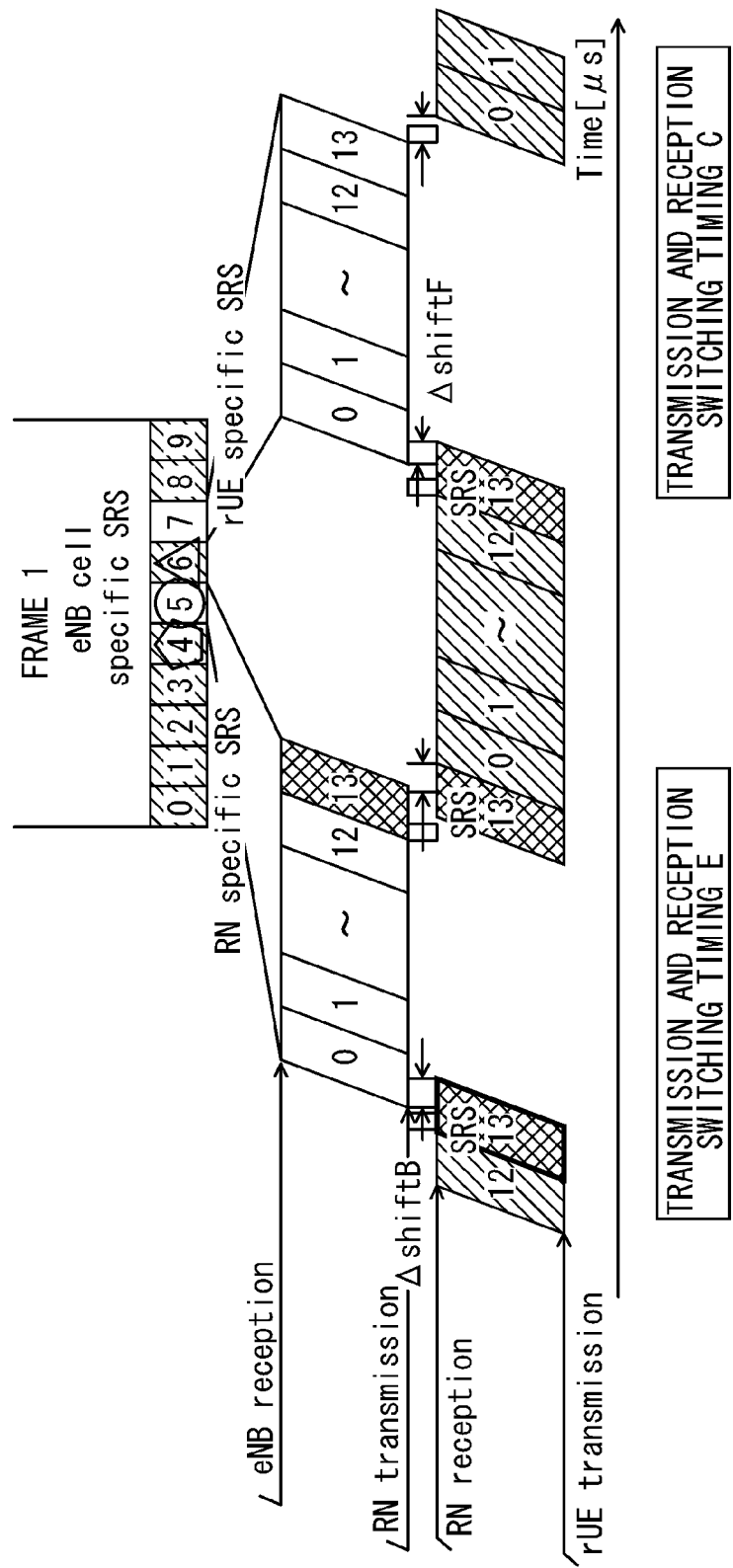
FIG. 9 is a diagram explaining a transmission and reception switching operation of a relay station 700.
Figure 10:
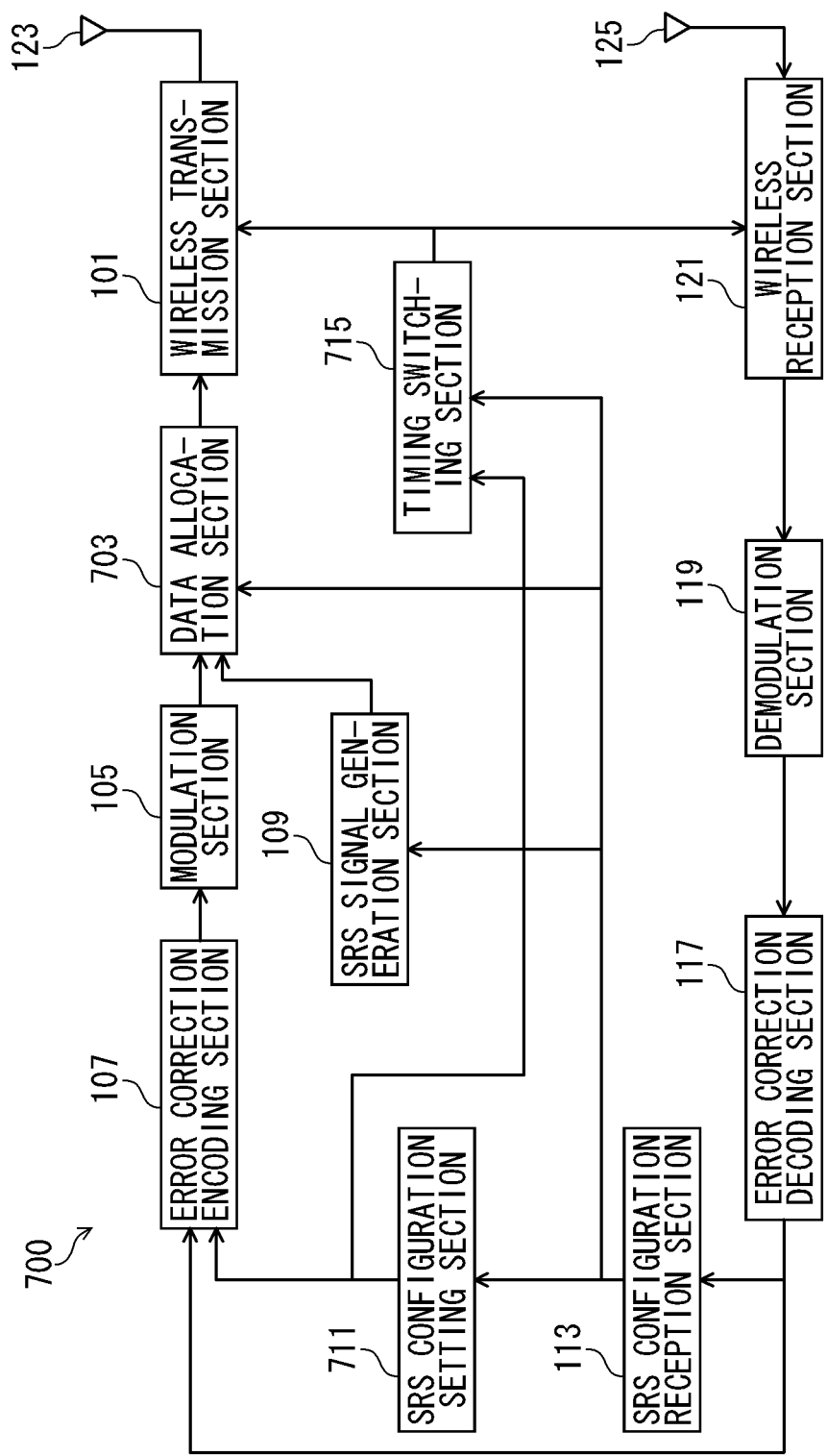
FIG. 10 is a block diagram illustrating the configuration of a relay device 700.

In frame 1 of FIG. 9, the subframe #4 is not allocated with the relay station cell specific SRS configuration and the mobile station specific SRS. Further, the subframe #5 is not allocated with the base station cell specific SRS configuration and the relay station specific SRS. Further, the subframe #6 is allocated with the mobile station specific SRS connected to the relay station 700.

Further, in the frame 1 of FIG. 9, subframes #5 and #7 (backhaul subframes) indicate communications from the relay station 700 to the base station 200, and other subframes indicate communications from the mobile station to the relay station (access link subframes). Each subframe includes SC-FDMA symbols #0 to #13. The symbol length of each SC-FDMA symbol is about 71.4 [ms].

Further, in FIG. 9, rUE transmission indicates the transmission timing of the mobile station 300, which is connected to the relay station 700, to the relay station 100, RN reception indicates the reception timing of the relay station 700 from the mobile station 300, RN transmission indicates the transmission timing of the relay station 700 to the base station 200, and eNB reception indicates the reception timing of the base station 200 from the relay station 700.

Further, in FIG. 9, tilting blocks denoted by SC-FDMA symbols #0 to #13 indicate the propagation delay of symbols.

The relay station 700 can control the reception timing of the relay station 700 from the mobile station 300 (or the transmission timing of the mobile station 300, which is connected to the relay station 700, to the relay station 700) that is indicated by RN reception. Further, the reception timing of the base station 200 from the relay station 700 (or the transmission timing of the relay station 700 to the base station 200) has been set in the base station 200.

Further, the base station 200 sets the specific SRS of the relay station 700 at an interval of 10 msec.

If the base station cell specific SRS configuration and the relay station specific SRS are not allocated in the backhaul subframe in the case of switching from the backhaul subframe to the access link subframe, the relay station 700 uses the fifth transmission and reception switching timing (transmission and reception switching timing E in FIG. 8) as described above. That is, in FIG. 9, since the base station cell specific SRS configuration and the relay station specific SRS are not allocated in the subframe #5 that is the backhaul subframe, the relay station 700 performs switching from the backhaul subframe to the subframe #6 that is the access link subframe using the fifth transmission and reception switching timing (transmission and reception switching timing E in FIG. 8) as described above.

Further, the third transmission and reception switching timing (transmission and reception switching timing C in FIG. 9) is used when the relay station 700 transmits the SC-FDMA symbols #0 to #13 to the base station 200 (including the case where the relay station 700 wants to transmit the PUCCH). The relay station 700 sets the SRS in the cell of the local station (relay station), receives the SC-FDMA symbol #12 from the mobile station 300, and then switches to transmission of the backhaul.

However, if the mobile station specific SRS under the relay station is not allocated to the same subframe as the backhaul subframe, the relay station 700 may use the third transmission and reception switching timing rather than the fifth transmission and reception switching timing.

Further, if the base station cell specific SRS configuration is not set or if the base station cell specific SRS configuration is set, but the relay station specific SRS is not allocated, the relay station 700 uses the third transmission and reception switching timing as described above.

Next, referring to FIG. 10, the configuration of the relay station 700 will be described. FIG. 10 is a block diagram illustrating the configuration of the relay station 700. The relay station 700 shown in FIG. 10 differs from the relay station 100 shown in FIG. 4 on the point that the relay station 700 includes a data allocation section 703, an SRS configuration setting section 711, and a timing switching section 715. The same reference numerals are used for the common configurations, and the detailed description thereof will be omitted.

The SRS configuration setting section 711 determines the relay station cell specific SRS configuration and the UE specific SRS configuration connected to the local station (relay station), and outputs the determined information to the error correction encoding section 107 and the timing switching section 715.

Here, if the base station cell specific SRS configuration and the relay station specific SRS are not allocated in the backhaul subframe (subframe #5 in FIG. 9) in the case of switching from the backhaul subframe to the access link subframe, the relay station 700 may allocate the mobile station cell specific SRS under the relay station to the same subframe as the backhaul subframe.

The data allocation section 703 allocates the SRS signal to the resource block (RB) in the subframe that transmits the SRS according to the relay station specific SRS configuration information received from the base station 200, allocates the data to the resource block (RB) in the subframe that transmits the data, and outputs the allocated SRS signal and data to the wireless transmission section 101.

The timing switching section 715 changes the switching timing from reception to transmission based on the relay station specific SRS configuration determined by the base station 200 and the relay station cell specific SRS configuration set by the relay station.

That is, the timing switching section 715 switches to reception after transmitting the SC-FDMA symbol #13 in the backhaul subframe in which the SRS transmission has been instructed by the base station 200. Further, the timing switching section 715 switches to reception after transmitting the SC-FDMA symbol #12 in the backhaul subframe in which the base station cell specific SRS configuration is allocated, but the relay station specific SRS is not allocated.

Further, in the above-described embodiments, the TD relay is also called a half duplex relay. Further, in-band relays may be used if there is no adequate isolation between a transmission antenna and a reception antenna.

Further, in the above-described embodiments, subframes of a normal CP have been described as an example. However, in the case of an extended CP (one symbol length is long, and one frame is composed of 12 SC-FDMA symbols), the number of the SC-FDMA symbol on which the SRS is transmitted becomes #11 (starts from #0). Only the access link side or the backhaul side may be of the extended CP, or both the access link side and the backhaul side may be of the extended CP.

Further, in the above-described embodiments, if the UL backhaul subframes are successively allocated, the above-described embodiments are applied to the switching of the first subframe of the successive subframes and the subframe of the access link immediately previous to the first subframe.

In the above-described embodiments, a transmission antenna or a reception antenna is exemplified, but the invention can be similarly applied to an antenna port.

The antenna port indicates a logical antenna in which one or plural physical antennas are configured. That is, the antenna port is not limited to one physical antenna, but may include an array antenna or the like that is composed of plural antennas. For example, in the LTE, how many physical antennas constitute the antenna port is not prescribed, but the antenna port is prescribed as the minimum unit in which a base station can transmit other reference signals. Further, the antenna port may be prescribed as the minimum unit for multiplying the weights of precoding vectors.

Further, respective function blocks used in the description of the embodiments may be typically realized by an LSI that is an integrated circuit. They may be individually fabricated into one chip or a part or the whole of them may be fabricated into one chip. Here, although LSI is exemplified, it may be called an IC, a system LSI, a super LSI, an ultra LSI, or the like, depending on the difference in integrity.

Further, the technique for the integrated circuit is not limited to LSI, and may be realized as a dedicated circuit or a general purpose processor. After the LSI fabrication, a FPGA (Field Programmable Gate array) that can be programmed after fabrication of the LSI or a reconfigurable processor that can reconfigure the connection or setting of the circuit cells in the LSI may be used.

Further, if technique for an integrated circuit appears, which substitutes LSI with the progress of the semiconductor technology or other derived technologies, the function blocks may be integrated using the technologies. Biotechnology may be possibly adapted.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-029408) filed on Feb. 12, 2010, the disclosure of which is incorporated herein by reference in its entirety.

INDUSTRIAL APPLICABILITY

The wireless relay device and the wireless relay method according to the invention have effects to improve the utilization efficiency of resources and are useful as a wireless relay station device and the like.

REFERENCE SIGNS LIST 100, 400, 400A, 700: relay station
101: wireless transmission section
103, 703: data allocation section
105: modulation section
107: error correction encoding section
109: SRS signal generation section
111, 711: SRS configuration setting section
113: SRS configuration reception section
115, 415, 415A, 715: timing switching section
117: error correction decoding section
119: demodulation section
121: wireless reception section
123: transmission antenna
125: reception antenna
200: base station
300: mobile station
401: timing switching instruction generation section
403: timing switching instruction reception section

The invention claimed is:

1. A wireless relay device that relays a signal between a base station and a mobile station, comprising:
   a transmitter configured to transmit a signal and an SRS to the base station using a backhaul subframe that is subframe for performing communication between the base station and the wireless relay device;
   a receiver configured to receive a signal and an SRS transmitted to the wireless relay device using an access link subframe that is subframe for performing communication between the mobile station and the wireless relay device at a reception start timing of the access link subframe shifted before a transmission end timing of the backhaul subframe; and
   one or more integrated circuits configured to:
   switch a transmission mode for performing transmission from the wireless relay device to the base station and a reception mode for performing reception from the mobile station; and
   set a configuration of the SRS that the mobile station transmits to the wireless relay device,
   wherein if the transmitter transmits the SRS in a subframe immediately previous to the backhaul subframe, a last symbol of the access link subframe is set as a fake symbol in which the SRS that the mobile station transmits to the wireless relay device is not configured,
   the receiver receives the signal transmitted from the mobile station to the wireless relay device in a symbol immediately previous to the fake symbol, and then the mode is switched from the reception mode to the transmission mode, and
   if the transmitter does not transmit the SRS in the subframe immediately previous to the backhaul subframes, the receiver receives the signal transmitted from the mobile station to the wireless relay device in the last symbol of the access link subframe, and then the mode is switched from the reception mode to the transmission mode.

2. A wireless relay device that relays a signal between a base station and a mobile station, comprising:
   a transmitter configured to transmit a signal and an SRS to the base station using a backhaul subframe that is subframe for performing communication between the base station and the wireless relay device;
   a receiver configured to receive a signal and an SRS transmitted to the wireless relay device using an access link subframe that is subframe for performing communication between the mobile station and the wireless relay device at a reception start timing of the access link subframe shifted after a transmission end timing of the backhaul subframe; and
   one or more integrated circuits configured to:
   switch a transmission mode for performing transmission from the wireless relay to the base station and a reception mode for performing reception from the mobile station; and
   set a configuration of the SRS that the mobile station transmits to the wireless relay device,
   wherein if the transmitter transmits the signal in a first symbol of the backhaul subframe, a last symbol of the access link subframe is set as a fake symbol in which the SRS that the mobile station transmits to the wireless relay device is not configured,
   the receiver receives the signal transmitted from the mobile station to the wireless relay device in a symbol immediately previous to the fake symbol, and then the mode is switched from the reception mode to the transmission mode, and
   if the transmitter does not transmit the signal in the first symbol of the access link subframe, the receiver receives the signal transmitted from the mobile station to the wireless relay device in the last symbol of the access link subframe, and then the mode is switched from the reception mode to the transmission mode.

3. A wireless relay device that relays a signal between a base station and a mobile station, comprising:
   a transmitter configured to transmit a signal and an SRS to the base station using a backhaul subframe that is subframe for performing communication between the base station and the wireless relay device;
   a receiver configured to receive a signal and an SRS transmitted to the wireless relay device using an access link subframe that is subframe for performing communication between the mobile station and the wireless relay device at a reception start timing of the access link subframe shifted after a transmission end timing of the backhaul subframe; and
   one or more integrated circuits configured to:
   switch a transmission mode for performing transmission from the wireless relay device to the base station and a reception mode for performing reception from the mobile station; and
   set a configuration of the SRS that the mobile station transmits to the wireless relay device,
   wherein if the transmitter transmits the signal in a last symbol of the backhaul subframe, the transmitter transmits the signal in the last symbol of the backhaul subframe, and then the mode is switched from the transmission mode to the reception mode,
   if the transmitter does not transmit the signal in the last symbol of the backhaul subframe, the last symbol of the backhaul subframe is set as a fake symbol in which the SRS that the wireless relay device transmits to the base station is not configured, the transmitter transmits the signal in a symbol immediately previous to the last symbol of the backhaul subframe, and then the mode is switched from the transmission mode to the reception mode, and the receiver receives the signal transmitted from the mobile station to the wireless relay device in a last symbol of the access link subframe having the same subframe number as the backhaul subframe, after switching from the transmission mode to the reception mode.

4. The wireless relay device according to claim 1, wherein the configuration of a cell specific SRS is determined for each cell as a subframe having a possibility for receiving the SRS by the base station or the wireless relay device, and the fake symbol is set by determining the configuration of a user equipment specific SRS among subframes included in the determined configuration of the cell specific SRS.

5. A wireless relay method for relaying a signal between a base station and a mobile station, comprising:

receiving a signal and an SRS transmitted to a relay station at a reception start timing of an access link subframe shifted before a transmission end timing of a backhaul subframe;

if the SRS is transmitted in a subframe immediately previous to the backhaul subframe, setting a last symbol of the access link subframe as a fake symbol in which the SRS that the mobile station transmits to the relay station is not configured;

receiving the signal transmitted from the mobile station to the relay station in a symbol immediately previous to the fake symbol, and then switching to transmission from the relay station to the base station; and if the SRS is not transmitted in the subframe immediately previous to the backhaul subframes, receiving the signal transmitted from the mobile station to the relay station in the last symbol of the access link subframe, and then switching to transmission from the relay station to the base station.

6. A wireless relay method for relaying a signal between a base station and a mobile station, comprising:

receiving a signal and an SRS transmitted to a relay station at a reception start timing of an access link subframe shifted after a transmission end timing of a backhaul subframe;

if the signal is transmitted in a first symbol of the backhaul subframe, setting a last symbol of the access link subframe as a fake symbol in which the SRS that the mobile station transmits to the relay station is not configured, receiving the signal transmitted from the mobile station to the relay station in a symbol immediately previous to the fake symbol, and then switching to transmission from the relay station to the base station; and if the signal is not transmitted in the first symbol of the backhaul subframe, receiving the signal transmitted from the mobile station to the relay station in the last symbol of the access link subframe, and then switching to transmission from the relay station to the base station.

7. A wireless relay method for relaying a signal between a base station and a mobile station, comprising:

receiving a signal and an SRS transmitted to a relay station at a reception start timing of an access link subframe shifted after a transmission end timing of a backhaul subframe;

if the signal is transmitted in a last symbol of the backhaul subframe, transmitting the signal in the last symbol of the backhaul subframe, and then switching to reception from the mobile station to a relay station; and if the signal is not transmitted in the last symbol of the backhaul subframe, setting the last symbol of the backhaul subframe as a fake symbol in which the SRS that the relay station transmits to the base station is not configured, switching to reception from the mobile station to the relay station after transmitting the signal in a symbol immediately previous to the last symbol of the backhaul subframe, and receiving the signal transmitted from the mobile station to the relay station in a last symbol of the access link subframe having the same subframe number as the backhaul subframe.

8. The wireless relay device according to claim 2, wherein the configuration of a cell specific SRS is determined for each cell as a subframe having a possibility for receiving the SRS by the base station or the wireless relay device, and the fake symbol is set by determining the configuration of a user equipment specific SRS among subframes included in the determined configuration of the cell specific SRS.

* * * * *